United States Patent
Erway et al.

(10) Patent No.: US 8,978,155 B2
(45) Date of Patent: Mar. 10, 2015

(54) APPARATUS, METHODS, AND COMPUTER PROGRAM PRODUCTS PROVIDING DYNAMIC PROVABLE DATA POSSESSION

(75) Inventors: Charles Christopher Erway, Providence, RI (US); Alptekin Küpçü, Providence, RI (US); Charalampos Papamanthou, Providence, RI (US); Roberto Tamassia, Providence, RI (US)

(73) Assignee: Brown University, Providence, RI (US)

( * ) Notice: Subject to any disclaimer, the term of this patent is extended or adjusted under 35 U.S.C. 154(b) by 1081 days.

(21) Appl. No.: 12/737,583

(22) PCT Filed: Jul. 24, 2009

(86) PCT No.: PCT/US2009/004322
§ 371 (c)(1),
(2), (4) Date: Apr. 3, 2013

(87) PCT Pub. No.: WO2010/011342
PCT Pub. Date: Jan. 28, 2010

(65) Prior Publication Data
US 2013/0198854 A1    Aug. 1, 2013

Related U.S. Application Data

(60) Provisional application No. 61/137,066, filed on Jul. 25, 2008.

(51) Int. Cl.
*G06F 21/00* (2013.01)
*G06F 21/60* (2013.01)
(Continued)

(52) U.S. Cl.
CPC ............. *G06F 21/60* (2013.01); *H04L 9/008* (2013.01); *H04L 9/3218* (2013.01); *H04L 9/3236* (2013.01); *H04L 2209/30* (2013.01)
USPC ............. 726/27; 726/2; 713/166; 709/204; 709/243

(58) Field of Classification Search
CPC .................................................. H04L 9/3236
USPC ............................................................ 726/27
See application file for complete search history.

(56) References Cited

U.S. PATENT DOCUMENTS 7,257,711 B2     8/2007  Goodrich et al. ............. 713/176
7,308,448 B1 *  12/2007  Martin et al. ........................ 1/1

(Continued)

OTHER PUBLICATIONS

Anagnostopoulos, et al., "Persistent Authenticated Dictionaries and Their Applications" (2001), (pp. 379-393).

(Continued)

*Primary Examiner* — Morshed Mehedi
(74) *Attorney, Agent, or Firm* — Merchant & Gould P.C.

(57) ABSTRACT

In one exemplary embodiment, a method includes: storing data for a file, organized as blocks, each having a portion of the file; and maintaining a skip list for the data. The skip list is an ordered tree structure having a root node, internal nodes and leaf nodes. Each leaf node corresponds to a block. Each node has a rank value corresponding to size of a subtree rooted at the node. The skip list employs a hashing scheme. The hash value of the root node and internal nodes is computed from a level of the node, the rank value and an interval between the node and another linked node to the right of or below the node. The hash value of the leaf nodes is computed from a level of the node, the rank value and an interval associated with the node.

20 Claims, 9 Drawing Sheets

| SCHEME | SERVER COMPUTATION | CLIENT COMPUTATION | COMMUNICATION COMPLEXITY | MODEL | BLOCK OPERATIONS | | | | PROBABILITY OF DETECTION |
|---|---|---|---|---|---|---|---|---|---|
| | | | | | APPEND | MODIFY | INSERT | DELETE | |
| PDP [2] | $O(1)$ | $O(1)$ | $O(1)$ | RANDOM ORACLE | ✓ | | | | $1-(1-f)^C$ |
| SCALABLE PDP [3] | $O(1)$ | $O(1)$ | $O(1)$ | RANDOM ORACLE | ✓* | ✓* | | ✓* | $1-(1-f)^C$ |
| DPDP I | $O(\log n)$ | $O(\log n)$ | $O(\log n)$ | STANDARD | ✓ | ✓ | ✓ | ✓ | $1-(1-f)^C$ |
| DPDP II | $O(n^\epsilon)$ | $O(\log n)$ | $O(\log n)$ | STANDARD | ✓ | ✓ | ✓ | ✓ | $1-(1-f)^{C\log n}$ |

(51) Int. Cl.
 H04L 9/00 (2006.01)
 H04L 9/32 (2006.01)

(56) References Cited

U.S. PATENT DOCUMENTS

| | | | | |
|---|---|---|---|---|
| 2004/0054807 A1* | 3/2004 | Harvey et al. | ................. | 709/243 |
| 2004/0107346 A1* | 6/2004 | Goodrich et al. | ............ | 713/176 |
| 2004/0221120 A1* | 11/2004 | Abrashkevich et al. | ...... | 711/170 |
| 2006/0059179 A1* | 3/2006 | Asano | ........................... | 707/100 |
| 2007/0276843 A1* | 11/2007 | Lillibridge et al. | ........... | 707/100 |
| 2010/0043057 A1* | 2/2010 | Di Battista et al. | ............... | 726/2 |
| 2014/0032513 A1* | 1/2014 | Gaither | ......................... | 707/698 |

OTHER PUBLICATIONS

Ateniese, et al., "Provable data possession at untrusted stores", (2007), (pp. 598-610).
Ateniese, et al., "Scalable and efficient provable data possession", SecureComm, (2008), (10 pages).
Blum, et al., "Checking the Correctness of Memories", Algorithmica, (1994), (pp. 225-244).
Clarke, et al., "Incremental multiset hash functions and their application to memory integrity checking", In *ASIACRYPT*, (2003), (pp. 188-207).
Dodis, "Proofs of retrievability via hardness amplification", (2009), (pp. 109-127).
Dwork, et al., "How efficient can memory checking be?", (2008), (pp. 503-520).
Gazzoni, et al., "Demonstrating data possession and uncheatable data transfer", Cryptology ePrint Archive, Report 2006/150, (2006), (9 pages).
Goodrich, et al., "Athos: Efficient authentication of outsourced file systems", In *ISC*, (2008), (pp. 80-96).
Goodrich, et al., "Implementation of an authenticated dictionary with skip lists and commutative hashing", In *DISCEX II*, (2001), (pp. 68-82).
Juels, et al., "PORs: Proofs of retrievability for large files", In *ACM CCS*, (2007), (pp. 584-597).
Kallahalla, et al., "Plutus: Scalable secure file sharing on untrusted storage", *FAST*, (2003), (pp. 29-42).
Kubiatowicz, et al., "Oceanstore: an architecture for global-scale persistent storage", *SIGPLAN Not.*, (2000), (pp. 1-12).
Li, et al., "Dynamic authenticated index structures for outsourced databases", In *SIGMOD*, (2006), (pp. 121-132).
Li, et al., "Secure Untrusted Data Repository (SUNDR)". *OSDI*, (2004), (pp. 121-136).
Maheshwari, et al., "How to build a trusted database system on untrusted storage", In *OSDI*, (2000), (pp. 10-26).
Merkle, et al., "A digital signature based on a conventional encryption function", (1987), (pp. 369-378).
G. Miller, "Riemann's hypothesis and tests for primality", In *STOC*, (1975), (pp. 234-239).
Muthitacharoen, et al., "Ivy: a Read/Write Peer-to-Peer File System". *OSDI*, (2002), (pp. 31-44).
Naor, et al., "Certificate revocation and certificate update". In *USENIX Security*, (1998), (pp. 17-17).
Naor, et al., "The complexity of online memory checking". In *FOCS*, (2005), (pp. 573-584).
Oprea, et al., "Space-Efficient Block Storage Integrity", (2005), (pp. 1-12).
Papamanthou, et al., "Time and space efficient algorithms for two-party authenticated data structures", In *ICICS*, (2007), (pp. 1-15).
Papamanthou, et al., "Authenticated hash tables", (2008), (pp. 437-448).
Pugh. "Skip lists: A probabilistic alternative to balanced trees", *Commun. ACM*, (Jun. 1990), (pp. 668-676).
Schwarz, et al., "Store, Forget, and Check: Using Algebraic Signatures to Check Remotely Administered Storage", (2006), (10 pages).
Sebe, et al., "Efficient Remote Data Possession Checking in Critical Information Infrastructures", Technical Report 04429, LAAS, Jul. 2004, IEES Trans on Knowledge and Data Engineering, vol. 20, No. 8, (Aug. 2008),(pp. 1-6).
Shacham, et al., "Compact proofs of retrievability", (2008), (pp. 1-36).
Tamassia, "Authenticated data structures", In *ESA*, (2003), (pp. 2-5).
Tamassia, et al., "Computational bounds on hierarchical data processing with applications to information security" (2005), (pp. 153-165).
Eshghi et al., "Jumbo Store: Providing Efficient Incremental Upload and Versioning for a Utility Rendering Service," 5th USENIX Conference on File and Storage Technologies (FAST), pp. 123-138, 2007.

* cited by examiner

| SCHEME | SERVER COMPUTATION | CLIENT COMPUTATION | COMMUNICATION COMPLEXITY | MODEL | BLOCK OPERATIONS | | | | PROBABILITY OF DETECTION |
|---|---|---|---|---|---|---|---|---|---|
| | | | | | APPEND | MODIFY | INSERT | DELETE | |
| PDP [2] | $O(1)$ | $O(1)$ | $O(1)$ | RANDOM ORACLE | ✓ | | | | $1-(1-f)^c$ |
| SCALABLE PDP [3] | $O(1)$ | $O(1)$ | $O(1)$ | RANDOM ORACLE | ✓* | ✓* | | ✓* | $1-(1-f)^c$ |
| DPDP I | $O(\log n)$ | $O(\log n)$ | $O(\log n)$ | STANDARD | ✓ | ✓ | ✓ | ✓ | $1-(1-f)^c$ |
| DPDP II | $O(n^\varepsilon)$ | $O(\log n)$ | $O(\log n)$ | STANDARD | ✓ | ✓ | ✓ | ✓ | $1-(1-f)^{c\log n}$ |

FIG.1

| | RSYNC | SAMBA | TCL |
|---|---|---|---|
| DATES OF ACTIVITY | 1996–2007 | 1996–2004 | 1998–2008 |
| # OF FILES | 371 | 1538 | 1757 |
| # OF COMMITS | 11413 | 275534 | 24054 |
| # OF UPDATES | 159027 | 275254 | 367105 |
| TOTAL LINES | 238052 | 589829 | 1212729 |
| TOTAL KBYTES | 8331 KB | 18525 KB | 44585 KB |
| AVG. # UPDATES/COMMIT | 13.9 | 10 | 15.3 |
| AVG. # COMMITS/FILE | 30.7 | 17.9 | 13.7 |
| AVG. # ENTRIES/DIRECTORY | 12.8 | 7 | 19.8 |
| PROOF SIZE, 99 % | 484 KB | 688 KB | 634 KB |
| PROOF SIZE PER COMMIT | 15 KB | 15 KB | 21 KB |
| PROOF TIME PER COMMIT | 1.2ms | 0.9ms | 1.3ms |

FIG.5

| NODE v | $v_1$ | $v_3$ | $v_4$ | $v_5$ | $w_3$ | $w_4$ | $w_5$ | $w_6$ | $w_7$ |
|---|---|---|---|---|---|---|---|---|---|
| $d(v)$ | 0 | 0 | 0 | 0 | 2 | 2 | 3 | 3 | 4 |
| $r(v)$ | 1 | 1 | 2 | 3 | 4 | 5 | 10 | 11 | 12 |
| $I(v)$ | [6,6] | [5,5] | [4,5] | [3,5] | [6,6] | [2,2] | [7,12] | [1,1] | [12,12] |
| $f(v)$ | $T(m_6)$ | $T(m_5)$ | $T(m_4)$ | $T(m_3)$ | $f(v_1)$ | $f(v_6)$ | $f(v_7)$ | $f(v_8)$ | $f(v_9)$ |

FIG.3

| NODE v | $v_1$ | $v_3$ | $v_4$ | $v_5$ | $w$ | $w_3$ | $w_4$ | $w_5$ | $w_6$ | $w_7$ |
|---|---|---|---|---|---|---|---|---|---|---|
| $d(v)$ | 0 | 0 | 0 | 0 | 1 | 2 | 2 | 3 | 3 | 4 |
| $r(v)$ | 1 | 1 | 2 | 3 | 4 | 5 | 6 | 11 | 12 | 13 |
| $I(v)$ | [6,6] | [5,5] | [4,5] | [3,5] | [3,6] | [7,7] | [2,2] | [8,13] | [1,1] | [13,13] |
| $f(v)$ | T | $T(m_5)$ | $T(m_4)$ | $T(m_3)$ | $f(v_2)$ | $f(v_1)$ | $f(v_6)$ | $f(v_7)$ | $f(v_8)$ | $f(v_9)$ |

FIG.4

APPARATUS, METHODS, AND COMPUTER PROGRAM PRODUCTS PROVIDING DYNAMIC PROVABLE DATA POSSESSION

CROSS-REFERENCE TO RELATED APPLICATIONS

This patent application claims priority from U.S. Provisional Patent Application No. 61/137,066, filed Jul. 25, 2008.

TECHNICAL FIELD

The exemplary embodiments of this invention relate generally to data storage and access and, more specifically, relate to access, security and updates for data stored by an untrusted agent (e.g., an untrusted remote server).

BACKGROUND

More and more, users are provided with the opportunity to store data at untrusted servers (e.g., third party, untrusted remote servers). For example, users may be able to access the remote storage via the internet in order to upload files for subsequent access or downloading (e.g., at a different location). As another example, some peer-to-peer (P2P) networks provide third party storage where the data is stored by a different agent or an entity other than the user (e.g., the user who uploaded or provided the data). As a non-limiting example, such an arrangement may be beneficial in order to provide other users with access to the data (e.g., based on considerations such as bandwidth usage and hosting capabilities).

In these settings, users may desire to check if their data has been tampered with or deleted by the storage server. In order to validate the data, the user may be required to download the data. If the outsourced data includes very large files or entire file systems, requiring the user to download the data will likely hinder validation and increase the expense (e.g., in terms of bandwidth and time), particularly if the client wishes to check the data frequently.

Consider online storage-outsourcing services (e.g., Amazon S3), outsourced database services [16], peer-to-peer storage [13, 19] and network file systems [12, 15]. The common concern in all these systems is the fact that the server (or peer) who stores the client's data is not necessarily trusted. Therefore, users would like to check if their data has been tampered with or deleted. However, outsourcing the storage of very large files (or whole file systems) to remote servers presents an additional constraint: the client should not download all stored data in order to validate it since this may be prohibitive in terms of bandwidth and time, especially if the client performs this check frequently (therefore authenticated data structures solutions [31] cannot be directly applied in this scenario).

Ateniese et al. [2] formalized this problem with a model called provable data possession (PDP). In this model, data (often represented as a file F) is preprocessed by the client, producing metadata that is used for verification purposes. The file is then sent to an untrusted server for storage, and the client may delete the local copy of the file. The client keeps some (possibly secret) information to check the server's responses later. The server proves the data has not been tampered with by responding to challenges sent by the client. The authors present several variations of their scheme under different cryptographic assumptions. These schemes provide probabilistic guarantees of possession, where the client checks a random subset of stored blocks with each challenge.

However, the PDP model and related schemes [2, 6, 11, 30] apply only to the case of static, archival storage, i.e., a file that is outsourced and never changes (one exception was developed simultaneously with this work [3] and is discussed in the related work section below). While the static model fits some application scenarios (e.g., libraries and scientific datasets), it is crucial to consider the dynamic case, where the client updates the outsourced data—by inserting, modifying, or deleting stored blocks or files—while maintaining data possession guarantees. Such a dynamic PDP (DPDP) scheme is essential in practical cloud computing systems for file storage [12, 15], database services [16], and peer-to-peer storage [13, 19].

As storage-outsourcing services and resource-sharing networks became popular, the problem of efficiently proving the integrity of data stored at untrusted servers has received increased attention. In the provable data possession (PDP) model, the client preprocesses the data and then sends it to an untrusted server for storage, while keeping a small amount of meta-data. The client later asks the server to prove that the stored data has not been tampered with or deleted (without downloading the actual data). However, the original PDP scheme applies only to static (or append-only) files.

SUMMARY

In one exemplary embodiment of the invention, an apparatus comprising: at least one memory configured to store data; and at least one processor configured to perform operations on the stored data, where the data comprises at least one file organized as a plurality of blocks with each block comprising at least a portion of the at least one file, where the apparatus is configured to maintain a skip list corresponding to the stored data, where the skip list comprises an ordered tree structure having a root node, at least one internal node and at least one leaf node, where each of the at least one leaf nodes corresponds to a block of the plurality of blocks, where each node of the skip list has an associated rank value corresponding to a size of a subtree of the skip list rooted at the node, where the skip list employs a hashing scheme to assign a hash value to each node of the skip list, where the hash value of the root node and the at least one internal node is computed from a level of the node within the skip list, the rank value of the node within the skip list and an interval between the node and another linked node that is to the right of or below the node, where the hash value of the at least one leaf node is computed from a level of the at least one leaf node within the skip list, the rank value of the least one leaf node and an interval associated with the at least one leaf node.

In another exemplary embodiment of the invention, a program storage device readable by a processor of an apparatus, tangibly embodying a program of instructions executable by the processor for performing operations, the operations comprising: storing data, where the data comprises at least one file organized as a plurality of blocks with each block comprising at least a portion of the at least one file; and maintaining a skip list corresponding to the stored data, where the skip list comprises an ordered tree structure having a root node, at least one internal node and at least one leaf node, where each of the at least one leaf nodes corresponds to a block of the plurality of blocks, where each node of the skip list has an associated rank value corresponding to a size of a subtree of the skip list rooted at the node, where the skip list employs a hashing scheme to assign a hash value to each node of the skip list, where the hash value of the root node and the at least one internal node is computed from a level of the node within the skip list, the rank value of the node within the skip list and an interval between the node and another linked node that is to the right of or below the node, where the hash value of the at least one leaf node is computed from a level of the at least one leaf node within the skip list, the rank value of the least one leaf node and an interval associated with the at least one leaf node.

In a further exemplary embodiment of the invention, a method comprising: storing data on at least one memory of an apparatus, where the data comprises at least one file organized as a plurality of blocks with each block comprising at least a portion of the at least one file; and maintaining, by the apparatus, a skip list corresponding to the stored data, where the skip list comprises an ordered tree structure having a root node, at least one internal node and at least one leaf node, where each of the at least one leaf nodes corresponds to a block of the plurality of blocks, where each node of the skip list has an associated rank value corresponding to a size of a subtree of the skip list rooted at the node, where the skip list employs a hashing scheme to assign a hash value to each node of the skip list, where the hash value of the root node and the at least one internal node is computed from a level of the node within the skip list, the rank value of the node within the skip list and an interval between the node and another linked node that is to the right of or below the node, where the hash value of the at least one leaf node is computed from a level of the at least one leaf node within the skip list, the rank value of the least one leaf node and an interval associated with the at least one leaf node.

BRIEF DESCRIPTION OF THE DRAWINGS

The foregoing and other aspects of embodiments of this invention are made more evident in the following Detailed Description, when read in conjunction with the attached Drawing Figures, wherein:

FIG. 1 shows a table illustrating a comparison of PDP schemes;

FIG. 3 shows the proof for the 5-th block of the file F stored in the skip list of FIG. 2;

FIG. 4 depicts the proof Π(5) as produced by Algorithm 3.4 for the update "insert a new block with data T after block 5 at level 1";

FIG. 5 illustrates authenticated CVS server characteristics;

DETAILED DESCRIPTION

1. Introduction

Figure 2:
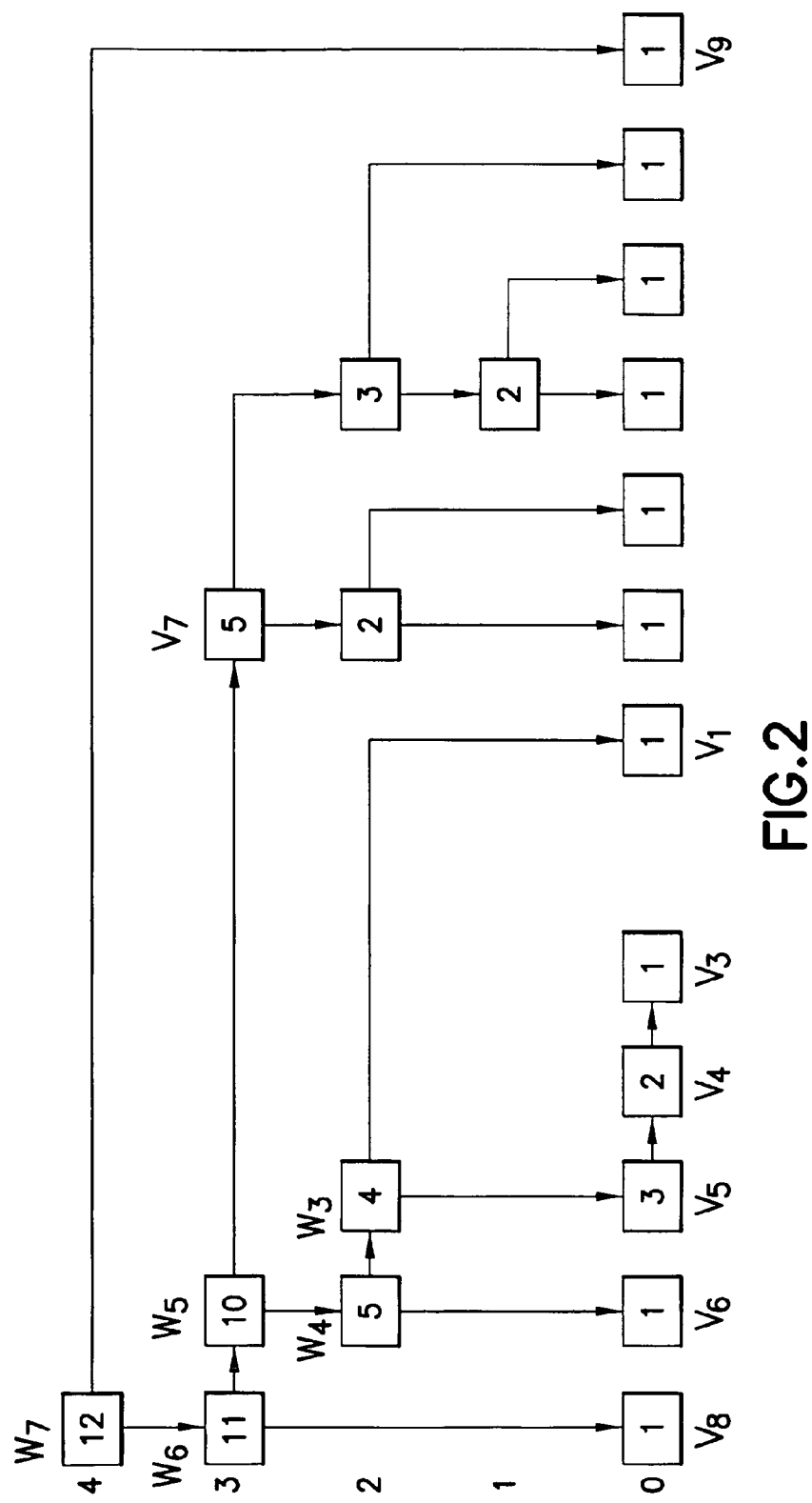
FIG. 2 shows an exemplary skip list used to store a file of 12 blocks using ranks in accordance with the exemplary embodiments of the invention.

Presented herein are a definitional framework and efficient constructions for dynamic provable data possession (DPDP), which extends the PDP model to support provable updates to stored data. A new version of authenticated dictionaries based on rank information is used. The price of dynamic updates is a performance change from $O(1)$ to $O(\log n)$ (or $O(n^\epsilon)$), for a file consisting of n blocks, while maintaining the same (or better, respectively) probability of misbehavior detection. Experiments show that this slowdown is very low in practice (e.g., 436 KB proof size and 30 ms computational overhead for a 1 GB file). It is also shown how to apply this DPDP scheme to outsourced file systems and version control systems (e.g., CVS).

Provided herein are a definitional framework and efficient constructions for dynamic provable data possession (DPDP), which extends the PDP model to support provable updates on the stored data. Given a file F consisting of n blocks, an update is defined as insertion of a new block (anywhere in the file, not only append), modification of an existing block, or deletion of any block. Therefore this update operation describes the most general form of modifications a client may wish to perform on a file.

The DPDP solution is based on a new variant of authenticated dictionaries where rank information is used to organize dictionary entries, rather than search keys. Thus, the solution is able to support efficient authenticated operations on files at the block level, enabling file operations such as authenticated insert and delete. The security of this DPDP constructions is proven using collision-resistant hash functions, the factoring assumption and the strong RSA assumption.

Furthermore, it is shown how to extend the construction to support data possession guarantees of a hierarchical file system as well as file data itself. To the best of the inventors' knowledge, this is the first construction of a provable storage system that enables efficient proofs of a whole file system, enabling verification at different levels for different users (e.g., every user can verify his or her own home directory) and at the same time without having to download the whole data (as opposed to [9]). This scheme yields a provable outsourced versioning system (e.g., CVS), which is evaluated by using traces of three different CVS repositories of well-known projects.

The main contributions of this work can be summarized as follows: (1) It introduces a formal framework for dynamic provable data possession (DPDP). (2) It provides the first efficient fully dynamic PDP solution using rank-based authenticated data structures that support operations on data blocks. (3) It presents a rank-based authenticated dictionary built over a skip list. This construction yields a DPDP scheme with logarithmic computation and communication and the same detection probability as the original PDP scheme (DPDP I in FIG. 1). (4) It gives an alternative construction (Section 6) of a rank-based authenticated dictionary using an RSA tree [25]. This construction results in a DPDP scheme with improved detection probability but higher server computation (see DPDP II in FIG. 1). (5) It presents practical applications of the DPDP construction to outsourced file systems and versioning systems (e.g., CVS, with variable block size support). (6) It provides an experimental evaluation of the novel skip list-based scheme.

FIG. 1 shows a table illustrating a comparison of PDP schemes: original PDP scheme [2]; Scalable PDP [3]; a DPDP scheme built on rank-based authenticated skip lists (described in further detail below); and a DPDP scheme built on rank-based RSA trees (also further described below). A star (*) indicates that in Scalable PDP a certain operation can be performed only a limited (pre-determined) number of times. In contrast, the DPDP schemes are fully-dynamic. n denotes the number of blocks of the file, $f$ is the fraction of the corrupted blocks, and C is the number of challenges used in [2, 3] and DPDP I. In all constructions, the storage space is $O(1)$ at the client and $O(n)$ at the server.

The efficiency of the DPDP schemes is summarized as follows, where n denotes the number of the blocks. The server computation, i.e., the time taken by the server to process an update or to compute a proof for a block, is $O(\log n)$ for DPDP I and $O(n^\epsilon)$ or $O(1)$ respectively for DPDP II. The client computation, i.e., the time taken by the client to verify a proof returned by the server, is $O(\log n)$. The communication complexity, i.e., the size of the proof returned by the untrusted server to the client, is $O(\log n)$; The client storage, i.e., the size of the meta-data stored locally by the client, is $O(1)$; Finally, the probability of detection, i.e., the probability of detecting a server misbehavior without downloading all the data, is $1-(1-f)^C$ for DPDP I and $1-(1-f)^{C \log n}$ for DPDP II, for fixed logarithmic communication complexity and where $f$ is the ratio of corrupted blocks.

Related Work and Observations.

The PDP scheme by Ateniese et al. [2] provides an optimal protocol for the static case that achieves $O(1)$ costs for all the complexity measures. They overview previous work on protocols fitting their model, but they find these approaches lacking; either they require expensive server computation or communication over the entire file [8, 22], linear storage for the client [29], or do not provide security guarantees for data possession [28]. Note that using [2] in a dynamic scenario is insecure due to replay attacks. As observed in [7], in order to avoid replay attacks, some kind of authenticated tree structure that incurs logarithmic costs must be employed and therefore constant costs under a dynamic scenario are not feasible.

Juels and Kaliski [11] present proofs of retrievability (PORs) and, like the PDP model, focus on static archival storage of large files. Their scheme's effectiveness rests largely on preprocessing steps the client conducts before sending a file F to the server: "sentinel" blocks are randomly inserted to detect corruption, F is encrypted to hide these sentinels, and error-correcting codes are used to recover from corruption. As expected, the error-correcting codes improve the error-resiliency of their system. Unfortunately, these operations prevent any efficient extension to support updates, beyond simply replacing F with a new file F'. Furthermore, the number of queries a client can perform is limited, and fixed a priori. Shacham and Waters have an improved version of this protocol called Compact POR [30], but their solution is also static (see [6] for a summary of POR schemes and related trade-offs).

In the solution of the exemplary embodiments of the invention, error-correcting codes or encryption are regarded as external to the system. For example, if the user wants to have more error-resiliency, she can provide a file that has error-correcting codes integrated (or an encrypted file if secrecy is desired). Such modifications to the file are regarded as external to the system. Since the construction does not modify the file and assumes no property on it, the system will work in perfect compliance.

Simultaneously with this work, Ateniese et al. have developed a dynamic PDP solution called Scalable PDP [3]. Their idea is to come up with all future challenges during setup and store pre-computed answers as metadata (at the client, or at the server in an authenticated and encrypted manner). Because of this, the number of updates and challenges a client can perform is limited and fixed a priori. In addition, their scheme is not fully dynamic: the number of updates is limited (otherwise the lower bound of [7] would be violated) and then the setup phase has to be executed again. Also, one cannot perform block insertions anywhere (only append-type insertions are possible). Specifically, each update requires re-creating all the remaining challenges. This can be problematic when a large file system is outsourced. Under these limitations, they provide a protocol with optimal asymptotic complexity ($O(1)$ in all complexity measures giving the same probabilistic guarantees as this scheme). Yet, their work is in the random oracle model whereas the scheme is provably secure in the standard model. Also, a DPDP framework is formally defined, and security proven accordingly.

This work is closely related to memory checking, for which lower bounds are presented in [7, 21]. In [7] it is proved that all non-adaptive and deterministic checkers have read and write query complexity summing up to $\Omega(\log n/\log \log n)$ (necessary for sublinear client storage), justifying the $O(\log n)$ cost in this scheme. Note that for schemes based on cryptographic hashing, an $\Omega(\log n)$ lower bound on the proof size has been shown [5, 32]. Related bounds for other primitives have been shown by Blum et al. [4].

Finally, observe that for DPDP I, one could have modified a dynamic Merkle tree (e.g., [14, 20]) instead of an authenticated skip list in order to achieve the same asymptotic performance. The specific choice of the skip list data structure is motivated by its simplicity of implementation and the fact that algorithms for dynamic updates in the two-party model (e.g., where the client does not have access to the whole data structure but only to a logarithmic-sized fragment of it) have been previously studied in detail for authenticated skips lists [24] but not for Merkle trees.

2. Model

This model builds on the PDP definitions from [2]. It starts by defining a general DPDP scheme, and then shows how the original PDP model is consistent with this definition.

Definition 1 (DPDP Scheme)

In a DPDP scheme, there are two parties. The client wants to off-load her files to the untrusted server. A complete definition of a DPDP scheme should describe the following (possibly randomized) efficient procedures:

KeyGen($1^k$)→{sk,pk} is a probabilistic algorithm run by the client. It takes as input a security parameter, and outputs a secret key sk and a public key pk. The client stores the secret and public keys, and sends the public key to the server.

PrepareUpdate(sk,pk,F,info,$M_c$)→{e(F),e(info),e(M)} is an algorithm run by the client to prepare (a part of) the file for untrusted storage. As input, it takes secret and public keys, (apart of) the file F with the definition info of the update to be performed (e.g., full re-write, modify block i, delete block i, add block b after block i, etc.), and the previous metadata $M_c$. The output is an "encoded" version of (a part of) the file e(F) (e.g., by adding randomness, adding sentinels, encrypting for confidentiality, etc.), along with the information e(info) about the update (changed to fit the encoded version), and the new metadata e(M). The client sends e(F), e(info), e(M) to the server.

PerformUpdate(pk,$F_{i-1}$,$M_{i-1}$,e(F),e(info),e(M)))→{$F_i$,$M_i$, $M_c'$,$P_{M_c'}$} is run by the server in response to an update request from the client. The input contains the public key pk, the previous version of the file $F_{i-1}$, the metadata $M_{i-1}$ and the client-provided values e(F),e(info),e(M). Note that the values e(F),e(info),e(M) are the values produced by PrepareUpdate. The output is the new version of the file $F_i$ and the metadata $M_i$, along with the metadata to be sent to the client $M_c'$ and its proof $P_{M_c'}$. The server sends $M_c'$, $P_{M_c'}$ to the client.

VerifyUpdate(sk,pk,F,info,$M_c$,$M_c'$,$P_{M_c'}$)→{ACCEPT,REJECT} is run by the client to verify the server's behavior during the update. It takes all the inputs the PrepareUpdate algorithm did*, plus the $M_c'$, $P_{M_c'}$ sent by the server. It outputs acceptance (F can be deleted in that case) or rejection signals.

*However, in this model F denotes part of some encoded version of the file and not part of the actual data (for generality purposes this is not made explicit).

Challenge(sk,pk,$M_c$)→{c} is a probabilistic procedure run by the client to create a challenge for the server. It takes the secret and public keys, along with the latest client metadata $M_c$ as input, and outputs a challenge c that is then sent to the server.

Prove(pk, $F_i$,$M_i$,c)→{P} is the procedure run by the server upon receipt of a challenge from the client. It takes as input the public key, the latest version of the file and the metadata, and the challenge c. It outputs a proof P that is sent to the client.

Verify(sk,pk,$M_c$,c,P)→{ACCEPT, REJECT} is the procedure run by the client upon receipt of the proof P from the server. It takes as input the secret and public keys, the client metadata $M_c$, the challenge c, and the proof P sent by the server. It outputting accept ideally means that the server still has the file intact. The security requirement of a DPDP scheme is defined below.

This model assumes there is a hidden input and output clientstate in all functions run by the client, and serverstate in all functions run by the server. Some inputs and outputs may be empty in some schemes. For example, the PDP scheme of [2] does not store any metadata at the client side. Also sk,pk can be used for storing multiple files, possibly on different servers. All these functions can be assumed to take some public parameters as an extra input if operating in the public parameters model, although this construction does not require such modifications. Apart from {ACCEPT, REJECT}, algorithm VerifyUpdate can also output a new client metadata $M_c$. In most scenarios, this new metadata will be set as $M_c$=$M_c'$.

Retrieval of a (part of a) file is very similar to the challenge-response protocol above, composed of Challenge, Verify, Prove algorithms, except that along with the proof, the server also sends the requested (part of the) file, and the verification algorithm must use this (part of the) file in the verification process.

Definition 2 (PDP Scheme)

A PDP scheme is consistent with the DPDP scheme definition, with algorithms PrepareUpdate, PerformUpdate and VerifyUpdate specifying an update that is a full re-write (or append).

As defined above, PDP is a restricted case of DPDP. It will now be shown how the DPDP definition (when restricted in this way) fits some previous schemes. The PDP scheme of [2] has the same algorithm definition for key generation, defines a restricted version of PrepareUpdate that can create the metadata for only one block at a time, and defines Prove and Verify algorithms similar to this model's definitions. It lacks an explicit definition of Challenge (but it is very easy to figure out). PerformUpdate is simply performing a full re-write or an append (so that replay attacks can be avoided), and VerifyUpdate is used accordingly, i.e., it always accepts in case of a full re-write or it is run as in DPDP in case of an append. It is clear that this model's definitions allow a broad range of DPDP (and PDP) schemes.

Having defined a DPDP scheme, now defined is the security of such a scheme, inspired by the security definitions of [2, 6]. Note that the restriction to PDP case gives a security definition for PDP schemes, compatible with previous definitions [2, 3].

Definition 3 (Security of DPDP)

Say that a DPDP scheme is secure if for any probabilistic polynomial time (PPT) adversary who can win the following data possession game with non-negligible probability, there exists an extractor that can extract (at least) the challenged parts of the file by resetting and challenging the adversary polynomially many times.

Data Possession Game: Played between the challenger who plays the role of the client and the adversary who acts as a server.

1. Keygen: The challenger runs KeyGen($1^k$)→{sk,pk} and sends the public key pk to the adversary.
2. ACF Queries: The adversary is very powerful. The adversary can mount adaptive chosen file (ACF) queries as follows. The adversary specifies a message F and the related information info specifying what kind of update to perform (see Definition 1) and sends these to the challenger. The challenger runs PrepareUpdate on these inputs and sends the resulting e(F),e(info),e(M) to the adversary. Then the adversary replies with $M_c'$,$P_{M_c'}$, which are verified by the challenger using the algorithm VerifyUpdate. The result of the verification is told to the adversary. The adversary can further request challenges, return proofs, and be told about the verification results. The adversary can repeat the interaction defined above polynomially-many times.
3. Setup: Finally, the adversary decides on messages $F_i^*$ and related information $info_i^*$ for all i=1, . . . , R of adversary's choice of polynomially-large (in the security parameter k) R≥1. The ACF interaction is performed again, with the first $info_1^*$ specifying a full re-write (this corresponds to the first time the client sends a file to the server). The challenger updates his local metadata only for the verifying updates (hence, non-verifying updates are considered not to have taken place—data has not changed).
4. Challenge: Call the final version of the file F, which is created according to the verifying updates the adversary requested in the previous step. The challenger holds the latest metadata $M_c$ sent by the adversary and verified as accepting. Now the challenger creates a challenge using the algorithm Challenge(sk,pk,$M_c$)→{c} and sends it to the adversary. The adversary returns a proof P. If Verify (sk,pk,$M_c$,c,P) accepts, then the adversary wins. The challenger has the ability to reset the adversary to the beginning of the challenge phase and repeat this step polynomially-many times for the purpose of extraction. Overall, the goal is to extract (at least) the challenged parts of F from the adversary's responses which are accepting.

Note that this definition coincides with extractor definitions in proofs of knowledge. For an adversary that answers a non-negligible fraction of the challenges, a polynomial-time extractor must exist.

3. Rank-Based Authenticated Skip Lists

In order to implement the first DPDP construction, use a modified authenticated skip list data structure [10]. This new data structure, which is called a rank-based authenticated skip list, is based on authenticated skip lists but indexes data in a different way. Note that one could have based the construction on any authenticated search data structure (e.g., a Merkle tree [17]) instead. This would work perfectly for the static case, but in the dynamic case one would need an authenticated red-black tree, and unfortunately no algorithms have been previously presented for rebalancing a Merkle tree while efficiently maintaining and updating authentication information (except for the three-party model, e.g., [14]). Yet, such algorithms have been extensively studied for the case of the authenticated skip list data structure [24]. Before presenting the new data structure, authenticated skip lists are briefly introduced.

FIG. 2 shows an exemplary skip list used to store a file of 12 blocks using ranks in accordance with the exemplary embodiments of the invention.

The authenticated skip list is a skip list [26] (see FIG. 2) with the difference that every internal node v of the skip list (which has two pointers, namely rgt(v) and dwn(v)) also stores a label $f(v)$ that is a cryptographic hash and is computed using some collision-resistant hash function h (e.g., SHA-1 in practice) as a function of $f(rgt(v))$ and $f(dwn(v))$. Using this data structure, one can answer queries such as "does 21 belong to the set represented with this skip list?" and also provide a proof that the given answer is correct. To be able to verify the proofs to these answers, the client must always hold the label $f(s)$ of the top leftmost node of the skip list (the root node, node $w_7$ in FIG. 2). Call $f(s)$ the basis (or root), and it corresponds to the client's metadata in the DPDP construction ($M_c = f(s)$). In this construction, the leaves of the skip list represent the blocks of the file. When the client asks for a block, the server needs to send that block, along with a proof that the block is intact.

Rank-Based Queries.

As noted before, one uses the authenticated skip list data structure [10] to check the integrity of the file blocks. However, the updates to be supported in the DPDP scenario are insertions of a new block after the i-th block and deletion or modification of the i-th block (there is no search key in this case, in contrast to [10], which basically implements an authenticated dictionary). If one were to use indices of blocks as search keys in an authenticated dictionary, the following problem arises. Suppose there is a file consisting of 100 blocks $m_1, m_2, \ldots, m_{100}$ and one wants to insert a block after the 40-th block. This means that the indices of all the blocks $m_{41}, m_{42}, \ldots, m_{100}$ should be incremented, and therefore an update becomes extremely inefficient. To overcome this difficulty, below are defined a novel hashing scheme and a way to search an authenticated skip list that is completely independent of the search keys—actually, search keys will not be used at all.

Let F be a file consisting of n blocks $m_1, m_2, \ldots, m_n$. The leaves of the skip list will contain some representation of the blocks, namely leaf i will store $T(m_i)$. For now, let $T(m_i) = m_i$ ($T(m_i)$ will be defined below). The actual block $m_i$ will be stored somewhere in the hard drive of the untrusted server. Every internal node v of the skip list stores the size of the subtree rooted on this node, namely how many leaves of the skip list can be reached from this node, instead of storing a search key. Call this number a rank or rank value of an internal node v and denote it with r(v).

Using the Rank Information.

Suppose now n blocks $m_1, m_2, \ldots, m_n$ are stored in the rank-based skip list. In order to find block i use the following method. Obviously, the rank of the top leftmost node v of the skip list is n (all blocks can be reached from that node). Naturally one can define low(v)=1 and high(v)=n. Let $\alpha$=rgt (v) and $\beta$=dwn(v) be the nodes that can be reached from v by following the right or the down pointer respectively. Suppose one searches for block i. One can now compute the intervals $[low(\alpha), high(\alpha)]$ and $[low(\beta), high(\beta)]$ by setting high($\alpha$)= high(v), low($\alpha$)=high(v)−r($\alpha$)+1, high($\beta$)=low(v)+r($\beta$)−1 and low($\beta$)=low(v). If now $i \in [low(\alpha), high(\alpha)]$ follow the right pointer that leads to $\alpha$, else follow the down pointer that leads to $\beta$. Continue in this way until reaching a node x that is at the zero-level with low(x)=i. It is easy to see that there always exists such a node which corresponds to the i-th block. Finally note that one does not have to store at each node the numbers high and low: they are computed on the fly using the stored ranks.

If one wants to update a block, traverse the search path (see Pugh [26]) for the desired element and update all of the affected values while the recursion returns (e.g., in case of an insertion, increase the ranks along the traversed path and recompute the relevant hashes according to Definition 4).

In order to extend authenticated skip lists with ranks, one must authenticate the ranks as well. Hence the hashing scheme defined in [10] can no longer be used. Let I(v) denote the interval that corresponds to node v. For example, in FIG. 2, one has $I(w_4)=[2,6]$ while $I(w_3)=[3,6]$. Let l(v) be the level of node v in the skip list, where l(v)=0 for leaf nodes v of the skip list. The new hashing scheme is as follows:

Definition 4 (Hashing Scheme with Ranks)

The label $f(v)$ of a node v in a skip list with ranks is computed as follows:

(a) if l(v)>0 then $f(v)=h(A\|I(dwn(v))\|f(dwn(v)),A\|I(rgt(v))\|f(rgt(v)));$ (b) if l(v)=0 and rgt (v)=null then $f(v)=h(A\|I(v)\|T(dat(v)),A\|I(suc(v))\|T(dat(suc(v))));$ (c) if l(v)=0 and rgt(v)≠null then $f(v)=h(A\|I(v)\|T(dat(v)),A\|I(rgt(v))\|f(rgt(v))),$ where A=l(v)‖r(v), ‖ denotes the concatenation operator, suc (v) is the successor node of v and dat(v) denotes the data at node v.

Note that, before inserting any block (i.e., if initially the skip list was empty), the basis, i.e., the label $f(v)$ of the top leftmost node v of the skip list, can easily be computed by hashing the sentinel values of the skip list;—the file consists of only two "fictitious" blocks—block 0 and block +∞.

Queries.

Suppose now the file F and a skip list on the file have been stored at the untrusted server. The client wants to verify the integrity of block i, and therefore queries for block i (we call the query rankAt(i)). The server constructs the proof Π(i) for block i as follows (see Algorithm 3.1). Let $v_1, v_2, \ldots, v_m$ be the search path in the skip list for block i (note that node $v_1$ corresponds to block i+1 and node $v_2$ corresponds to block i and therefore this is concerned with the reverse path). For every node $v_j, 1 \leq j \leq m$, a 4-tuple $A(v_j)$ is added to the proof. The 4-tuple $A(v_j)$ contains the level l($v_j$), the rank r($v_j$), an interval $I(v_1)$ and a hash value (label) $f(v_j)$. For those nodes $v_j$ that lie in the zero level, the interval value is $I(v_j)$ and the hash value is $T(data(v_j))$. For those nodes that lie above the zero level, $I(v_j)$ equals the $I(v')$ and $f(v_j)$ equals $f(v')$, where $v'$ is either $rgt(v_j)$ or $dwn(v_j)$ according from where $v_j$ gets its hash value. For example, the proof for the 5-th block of the skip list of FIG. 2 is depicted in FIG. 3. Finally, note that since any search path in the skip list is expected to be of logarithmic length (in the number of blocks) with high probability, the expected size of the proof is logarithmic with high probability too.

---
Algorithm 3.1: $\Pi(i)$ = rankAt ( i )
---
1: Let $v_1, v_2, \ldots, v_m$ be the search path for block i ;
2: return $\Pi(i) = \{A(v_1), A(v_2), \ldots, A(v_m)\}$;
---

Verification.

After receiving the 4-tuples $A(v_j)$ which are the proof for a block $m_i$, the client has to process them and compute a value $f'$. If $f'$ is equal to the locally stored metadata $M_c$, then the verification algorithm outputs ACCEPT, else it outputs REJECT (see Algorithm 4). If it outputs ACCEPT, then with high probability, the server indeed stores $T(m_i)$ intact [24] (recall that $T(m_i)$ is a representation of the data of the actual block $m_i$—which can be viewed as $m_i$ itself for the sake of presentation—and this is what is stored at the leaves of the skip list). In order to show how to process the given proof, one needs to define hashing between 4-tuples:

Definition 5 (Hashing with Ranks)

Given two 4-tuples $A(u)=(l(u), r(u), I(u), f(u))$, $A(v)=(l(v), r(v), I(v), f(v))$ that correspond to two consecutive nodes u, v of a path of the skip list such that $u=rgt(v)$ or $u=dwn(v)$ define $S(A(u), A(v))$ as the 4-tuple $(l(v), r(v), I(v), h(A\|I(v)\|f(v), A\|(u)\|f(u))))$, where $A=l(v)\|r(v)$.

Note that operation S is associative: For every $A(v_i), A(v_j), A(v_k)$ such that $v_i, v_j$ and $v_k$ form an upward path in the skip list it is $S(A(v_i), A(v_j), A(v_k))=S(S(A(v_i), A(v_j)), A(v_k))$. One now has the following result:

Lemma 1

Let $v_1, v_2, \ldots, v_m$ be a reverse search path for a leaf node x in a skip list where the hashing scheme with ranks is used. Let L be the maximum level, n be the number of stored items and $A(v_i)$ ($i=1, \ldots, m$) be the 4-tuple that corresponds to each node $v_i$. It is $S(A(v_1), A(v_2), \ldots, A(v_m))=(L, n, [1, n], f(s))$, where $f(s)$ is the label of the top-leftmost node.

From now on, $\lambda(A(v_1), A(v_2), \ldots, A(v_m))$ denotes the last element of $S(A(v_1), A(v_2), \ldots, A(v_m))$ (i.e., the last element of the 4-tuple $A(v_m)$, which is the value $f(s)$ appearing in Lemma 1). Now, in order to perform verification, the client applies $S(\bullet, \bullet)$ sequentially to the proof $\Pi(i)$ sent by the server, according to Definitions 4 and 5 and outputs ACCEPT or REJECT according to whether $\lambda(\Pi(i))=M_c$ or not.

---
Algorithm 3.2: {ACCEPT, REJECT} = verify ( $\Pi(i)$ , $M_c$ )
---
1: Let $\Pi(i)$ be the proof returned by Algorithm 3.1;
2: if $\lambda(\Pi(i)) = M_c$ then return ACCEPT ;
3: return REJECT ;
---

Note that one must authenticate all the intervals, ranks and levels since they are critical in verification. Suppose one queries for the i-th block. Then the server sends a proof that consists of the 4-tuples $\{A(v_1), A(v_2), \ldots, A(v_m)\}$. As before, denote with $l(v_i), r(v_i), I(v_i), f(v_i)$ the level, rank, interval and label that corresponds to node $v_i$ for $i=1, \ldots, m$, respectively. Note that for $v_t$ such that $l(v_t)=0$ one has that $f(v_t)=T(data(v_t))$. Process all zero-level nodes $v_1, \ldots, v_{k'}$ until reaching a node u such that $low(u)=i$. If one applies $S(\bullet, \bullet)$ to $\{A(v_1), \ldots, A(v_m)\}$ and the results equals $M_c$, then one is assured that the data corresponding to block i is $f(u)$, i.e., the mapping between data blocks and indices is correct.

Updates.

The possible update types in this DPDP scheme are insertions of a new block after the i-th block, deletions of the i-th block, and modifications of the i-th block for $1 \leq i \leq n$. Suppose the client wants to insert a new block after the i-th block. He sends an "insert" query to the server. While performing the insertion (see Algorithm 3.3), the server also computes the proof $\Pi(i)$ (using Algorithm 3.1). The server then sends the proof $\Pi(i)$ along with the new metadata $M_c'$ to the client ($M_c'$ is the new basis). Note that when the server performs an insertion or deletion, it must update (and also include in the hashing scheme) the ranks and the intervals as well (see line 5 of Algorithm 3.3). This can be easily done in $O(\log n)$ time: it is easy to see that only ranks and intervals along the search path of the skip list are affected.

---
Algorithm 3.3: $\{M_c', \Pi(i)\}$ = performUpdate ( i , T , upd )
---
1: set $\Pi(i)$ = query(i);
2: if upd = ins then insert T after block i in the skip list;
3: if upd = del then delete block i in the skip list;
4: if upd = modify then set $T(m_i) = T$ in the skip list;
5: forall affected nodes v, update $A(v)$ , $f(v)$ to $A'(v)$, $f'(v)$ ;
6: return $\{f'(s), \Pi(i)\}$; ( s is the basis of the skip list)
---

After the client has received the proof $\Pi(i)$ and the metadata $M_c'$, he has to process $\Pi(i)$ and produce another updated proof $\Pi'(i)$ using Algorithm 3.4. This is done by using a variation of the algorithm update presented in [24].

---
Algorithm 3.4: {ACCEPT, REJECT} = verUpdate( $M_c'$, $\Pi'(i)$ , i , upd )
---
1: process $\Pi(i)$ according to [24] and upd to produce $\Pi'(i)$;
2: if $\lambda(\Pi(i)) = M_c'$ then return ACCEPT ;
3: return REJECT ;
---

To give some intuition of how Algorithm 3.4 produces proof $\Pi'(i)$, the reader can verify that the table of FIG. 4 corresponds to $\Pi'(5)$, the proof that the client produces from the table of FIG. 3 in order to verify the update "insert a new block with data T after block 5 at level 1 of the skip list of FIG. 2". This update causes the creation of two new nodes in the skip list, namely the node that holds the data for the 6-th block, $v_2$, and node w (5-th line of FIG. 4) that needs to be inserted in the skip list at level 1. Note that $f(v_2)=h(0\|1\|[6,6]\|T,0\|1[7,7]\|T(data(v_1)))$ is computed as defined in Definition 4 and that the ranks and the intervals along the search path are increased due to the addition of one more block.

4. DPDP Scheme Construction

This section presents the first DPDP construction (DPDP I). Later in this section, techniques are discussed that can be used to improve efficiency (blockless verification). Presented now are each of the algorithms as defined in Definition 1 in Section 2. In the following, n is the current number of the blocks of the file and the logarithmic time derived for most of the operations are due to well-known results about authenticated skip lists [10, 25]. Most of the material of this section also applies for DPDP II (RSA trees), presented in Section 6.

KeyGen($1^k$)→{sk,pk}: The scheme does not require any keys to be generated. So, this procedure's output is empty, and, hence, none of the other procedures make use of these keys.

PrepareUpdate(sk,pk,F,info,$M_c$)→{e(F),e(info),e(M)}: This is a dummy procedure that outputs the file F and information info it receives as input. $M_c$ and e(M) are empty (not used).

PerformUpdate(pk,$F_{i-1}$,$M_{i-1}$,e(F),e(info),e(M))→{$F_i$,$M_i$, $M_c'$,$P_{M_c}$}: Inputs $F_{i-1}$,$M_{i-1}$ are the previously stored file and metadata on the server (empty if this is the first run). e(F), e(info), e(M), which are output by PrepareUpdate, are sent by the client (e(M) being empty). The file is stored as is, and the metadata stored at the server is a skip list (where for block b, T(b) is the block itself). The procedure updates the file according to e(info), outputting $F_i$, runs the skip list update procedure on the previous skip list $M_{i-1}$ (or builds the skip list from scratch if this is the first run), outputs the resulting skip list as $M_i$, the new skip list root as $M_c'$, and the proof returned by the skip list update as $P_{M_c}$. This corresponds to calling Algorithm 3.3 on inputs the new data T (in case of an insertion or a modification), a block index j and the type of the update upd. Note that the index j and the type of the update upd is taken from e(info) and the new data T is e(F). Finally, Algorithm 3.3 outputs $M_c'$ and $P_{M_c}$=Π(j) which are output by PerformUpdate. The expected runtime is O(log n) whp (with high probability).

VerifyUpdate(sk,pk,F,info,$M_c$,$M_c'$,$P_{M_c}$)→{ACCEPT, REJECT}: Client metadata $M_c$ is the previous skip list root the client has (empty for the first time), whereas $M_c'$ is the new root sent by the server. The client runs Algorithm 3.4 using the tag $M_c'$ and the proof sent by the server $P_{M_c}$ as input, and compares the root output by that procedure with $M_c'$. If they are the same, the client sets $M_c$=$M_c'$ and accepts. The client may now delete the new block from its local storage. This procedure is a direct call of Algorithm 3.4. It runs in expected time O(log n) whp.

Challenge(sk,pk,$M_c$)→{c}: This procedure does not need any input apart from knowing the number of blocks in the file (n). It might additionally take a parameter C which is the number of blocks to challenge. The procedure creates C random block IDs between 1, . . . , n. This set of C random block IDs are sent to the server and is denoted with c. The runtime is O(C). Note that C will be a constant (see Section 8).

Prove(pk,$F_i$,$M_i$,c)→{P}: This procedure uses the last version of the file $F_i$ and the skip list $M_i$, and the challenge c sent by the client. It runs the skip list prover to create a proof on the challenged blocks. Namely, let $i_1, i_2, \ldots, i_C$ be the indices of the challenged blocks. Prove calls Algorithm 3.1 C times (with arguments $i_1, i_2, \ldots, i_C$) and sends back C proofs. All these C skip list proofs form the output P. The runtime is expected O(C log n) whp.

Verify(sk,pk,$M_c$,c,P)→{ACCEPT, REJECT}: This is a function takes the last skip list root $M_c$ the client has as input, as well as the challenge c sent to the server, and the proof P received from the server. It then runs the skip list verification using the proof sent by the server to obtain a new skip list root. If this root matches $M_c$ then the client accepts. All these are achieved by calling Algorithm 3.2 C times, which takes expected O(C log n) time whp.

As presented above, the core DPDP construction does not provide blockless verification. Namely for each block b, one has T(b)=b. In the next section, it is shown how to prevent downloading of the blocks by the client, and obtain a very efficient DPDP protocol.

Blockless Verification Using Tags.

In the construction above, the skip list leaves were used as the data blocks themselves. This requires the client to download all the challenged blocks for verification purposes, since the skip list proof includes leaves. For more efficiency (i.e., blockless verification), one can employ homomorphic tags as in [2]. However, the tags described herein are simpler and more efficient to compute. It is briefly noted that homomorphic tags are tags that can be combined and verified at once.

Set each leaf $T(m_i)$ of the skip list to be the tag of block $m_i$. The tags (explained further below) are small in size compared to data blocks. Therefore, making the skip list leaves to be tags provides two main advantages. Firstly, the skip list can be kept in memory. Secondly, instead of downloading the data, the client can just download the tags. The integrity of the tags themselves are protected by the skip list, and the tags protect the integrity of the data. Before talking about the tags, one needs to modify the KeyGen algorithm to output pk=(N,g), where N=pq is a product of two primes, and g is an element of high order in $Z^*_N$. The public key pk is sent to the server. There is no secret key.

In the skip list, tags $T(m_i)=g^{m_i}$ mod N will be used as the skip list leaves instead of the blocks. Therefore, the skip list proof will contain these tags instead of the blocks themselves. This computation can be carried out easily with the knowledge of the public key and the block. Alternatively, the server can store the tags for faster proof computation.

The Prove procedure now sends the skip list proof for the challenged blocks $m_{i_j}$ ($1 \le i_1, \ldots, i_C \le n$ denote the challenged indices, where C is the number of challenged blocks, and n is the total number of blocks), with the tags as leaves. The server also sends a combined block $M=\sum_{j=1}^{C} a_j m_{i_j}$, where $a_j$ are random values sent by the client as part of the challenge. The size of this combined block is roughly the size of a single block, and thus imposes much smaller overhead than sending C blocks. This achieves blockless verification. Also, the Verify algorithm computes $T=\prod_{j=1}^{C} T(m_{i_j})^{a_j}$ mod N, and accepts if $T=g^M$ mod N and the skip list (with tags as leaves) proof verifies.

The Challenge procedure can also be made more efficient by using the ideas in [2]. First, instead of sending random values $a_j$ separately, the client can simply send a random key to a pseudo-random function that will generate those values. Second, a key to a pseudo-random permutation can be sent to select the challenged blocks: if $1 \le i_j \le n$ (j=1, . . . , C) are pseudo-random block numbers generated using that key, the challenged blocks will be $m_{i_j}$ for each j=1, . . . , C. Definitions of these pseudo-random families can be put into the public key. See [2] for more details on this challenge procedure. Thus, usage of these homomorphic tags enables blockless verification, and the main result is as follows:

Theorem 1.

Assume the existence of a collision-resistant hash function and that the factoring assumption holds. The dynamic provable data possession scheme presented in this section (DPDP I) for a file consisting of n blocks has the following properties, where f is the ratio of the number of tampered blocks over the total number of blocks of the file:

1. It is secure according to Definition 3;
2. The probability of detecting a tampered block while keeping the communication complexity O(log n) is $1-(1-f)^C$, where C=O(1) is the number of the blocks challenged;

3. The expected update time is O(log n) at both the server and the client whp;
4. The expected query time at the server, the expected verification time at the client and the expected communication complexity for challenging C random blocks is O(C log n) whp;
5. The client uses O(1) space;
6. The server uses O(n) expected space whp.

5. Security

In this section the security of the DPDP scheme is proven. The presented security section refers to DPDP I. However, it applies as is to DPDP II, as the only difference is the authenticated structure used, which, in turn, protects the integrity of the tags using another cryptographic primitive. Continue with the following lemma:

Lemma 2.

Assuming the existence of a collision-resistant hash function, the proofs generated using the rank-based authenticated skip list guarantees the integrity of its leaves $T(m_j)$ with non-negligible probability.

Proof:

Follows from the two-party authenticated skip list construction (Theorem 1 in [24]), and the discussion in Section 3.

Theorem 2 (Security of Core DPDP Protocol).

The DPDP protocol without tags is secure in the standard model according to Definition 3 and assuming the existence of a collision-resistant hash function.

Proof:

Assume that the adversary wins the data possession game in Definition 3. Then, it is shown that the challenger can either extract the challenged blocks, or break the collision-resistance of the hash function used. Here, the challenger will have two sub-entities: An extractor who extracts the challenged blocks from the adversary's proof, and a reductor who breaks the collision-resistance if the extractor fails to extract the original blocks.

As input, the challenger is given a hash function, which he also passes on to the reductor. The challenger plays the data possession game with the adversary using this hash function, honestly answering every query of the adversary. As the only difference from the real game, the challenger provides the reductor with the blocks (together with their ids) whose update proofs have verified, so that the reductor can keep them in its storage. Note that the extractor does not know the original blocks, only the reductor does. Also note that the reductor keeps updating the blocks in its storage when the adversary performs updates. Therefore, the reductor always keeps the latest version of each block. This difference is invisible to the adversary, and so he will behave in the same way as he would to an honest challenger. At the end, the adversary replies to the challenge sent by the challenger. The extractor just outputs the blocks contained in the proof sent by the adversary. If this proof verifies, and hence the adversary wins, it must be the case that either all the blocks are intact (and so the extractor outputs the original blocks) or the reductor breaks collision-resistance as follows.

The challenger passes all the blocks (together with their ids) in the proof to the reductor. By Lemma 2, if one has a skip list proof that verifies, but at least one block that is different from the original block (thus the extractor failed), the reductor can output the original block (the—latest verifying version of the—block he stored that has the same block id) and the block sent in the proof as a collision. Therefore, if the adversary has a non-negligible probability of winning the data possession game, the challenger can either extract (using the extractor) or break the collision-resistance of the hash function (using the reductor) with non-negligible probability.

Next is analyzed an improved DPDP construction which uses tags. Note that the security of the main scheme relies on neither the RSA assumption nor the knowledge of exponent assumption as in [2] since the tags are simpler. In this construction, one needs an extra assumption stated below.

Definition 6 (Factoring Assumption).

For all PPT adversaries A and large-enough number N=pq which is a product of two primes p and q, the probability that A can output p or q given N is negligible in the size of p and q.

Theorem 3 (Security of Tagged DPDP Protocol).

The DPDP protocol with tags is secure in the standard model according to Definition 3 and assuming the existence of a collision-resistant hash function and that the factoring assumption holds.

Proof:

Assume that the adversary wins the data possession game in Definition 3. Then, it is shown that the challenger can either extract the challenged blocks, or break the collision-resistance of the hash function used, or break the factoring assumption, by interacting with the adversary.

The challenger is given a hash function, and an integer N=pq but not p or q. The challenger then samples a high-order element g (a random integer between 1 and N−1 will have non-negligible probability of being of high order in $Z_N^*$, which suffices for the sake of reduction argument—a tighter analysis can also be performed). He interacts with the adversary in the data possession game honestly, using the given hash function, and creates the tags while using N as the modulus and g as the base.

As in the previous proof, the challenger will have two sub-entities: An extractor who extracts the challenged blocks from the adversary's proof, and a reductor who breaks the collision-resistance of the hash function or factors N, if the extractor fails to extract the original blocks. The challenger acts as in the previous proof.

First, consider the case where only one block is challenged. If the adversary wins, and thus the proof verifies, then the challenger can either extract the block correctly (using the extractor), or break the factoring assumption or the collision-resistance of the hash function (using the reductor), as follows.

Call the block sent in the proof by the adversary x, and the original challenged block stored at the reductor b. The extractor just outputs x. If the extractor succeeds in extracting the correct block, then one is done. Now suppose the extractor fails, which means x≠b. The challenger provides the reductor with the block x in the proof, its block id, the hash function, and g, N. Then the reductor retrieves the original block b from its storage, and checks if $g^x = g^b$ mod N. If this is the case, the reductor can break the factoring assumption; otherwise, he breaks the collision-resistance of the hash function. If $g^x = g^b$ mod N, this means x=b mod $\phi(N)$ (where $\phi(N)$ denotes the order of $Z_N^*$, which is (p−1)(q−1)), which means x−b=k$\phi$(N) for some integer k≠0 (since the extractor failed to extract the original block). Hence, x−b can be used in Miller's Lemma [18], which leads to factoring N. Otherwise $g^x \neq g^b$ mod N. This means, there are two different tags that can provide a verifying skip list proof. By Lemma 2, the reductor can break the collision-resistance of the hash function by outputting ($g^x$ mod N) and ($g^b$ mod N).

Now consider challenging C blocks. Let $i_1, i_2, \ldots, i_C$ be the C challenged indices. Recall that each block is not sent individually. Instead, the adversary is supposed to send a linear combination of blocks $M = \sum_{j=1}^{C} a_j m_{i_j}$ for random $a_j$ sent by the challenger. One can easily plug in the extractor at the last paragraph of the proof of Theorem 4.3 in [2]. The idea of the extraction is to reset and challenge with independent $a_j$ and get enough independent linear equations that verifies from the adversary to solve for each $m_{i_j}$ (thus, the extractor is just an algebraic linear solver). As long as the extractor obtains enough independent linear equations whose proofs verified, it will extract the blocks. If the extractor fails to extract the original blocks, one can employ the reductor as follows.

With each rewind, if the proof given by the adversary verifies, the challenger passes on the M value and the tags in the proof to the reductor, along with the challenge. Call each original blocks $b_{i_j}$. The reductor first checks to see if there is any tag mismatch:

$$T(m_{i_j}) \neq g^{b_{i_j}}$$

mod N, for some $1 \le j \le C$. If this is the case, the reductor can output $T(m_{i_j})$ and $$g^{b_{i_j}}$$

mod N for that particular j as a collision, using Lemma 2. If all the tags match the original block, the reductor uses the challenge and the ids of the challenged blocks to compute linear combination $B = \Sigma_{j=1}^{C} a_j b_{i_j}$ of the original blocks he stored. Since the proof sent by the adversary verified, one has $T = \Pi_{j=1}^{C} T(m_{i_j})^{a_j} \bmod N = g^M \bmod N$. Since all the tags were matching, one has $$T(m_{i_j}) = g^{b_{i_j}}$$

mod N for all $1 \le j \le C$. Replacing the tags in the previous equation, one obtains $T = g^B \bmod N$. Now, if $M \neq B$, then it leads to factoring using Miller's Lemma [18] as before (one has $g^M = g^B \bmod N$ with $M \neq B$). Otherwise, if $M = B$ for all the rewinds, then the reductor fails, but this means the extractor was successful.

When challenging multiple blocks, if the adversary can respond to a non-negligible fraction of challenges, since the extractor needs only polynomially-many equations, by rewinding polynomially-many times, the challenger can either extract the original blocks (using the extractor), or break the collision-resistance of the hash function used or the factoring assumption (using the reductor) with non-negligible probability. This concludes the proof of Theorem 3.

Probability of Detection.

As mentioned before, the client probes C blocks by calling the Challenge procedure. Obviously, if the server tampers with a block with block id different than the probed ones, the server will not be caught. Assume now that the server tampers with any T blocks. If the total number of blocks is n, the probability that at least one of the probed blocks matches at least one of the tampered blocks is $1-((n-T)/n)^C$, since choosing C of n-T non-tampered blocks has probability $((n-T)/n)^C$.

As mentioned before, error-correcting codes can be applied external to the system to further increase the error-resiliency of the file. Such modifications are not taken into account when considering the probability of detection. Also, depending on its usage, some DPDP systems can tolerate some errors, e.g., movie files. Using the numbers from Section 8, one obtains a probability of 0.993 of getting caught. For many application scenarios, like Amazon S3, this probability will be high enough to deter any malicious behavior, especially considering the fact that one also has a public verifiability protocol that can be used for official arbitration purposes.

6. Rank-Based RSA Trees

Now described is how one can use ideas from [25] to implement the DPDP II scheme (see Table 1), which has a higher probability of detection, still maintains logarithmic communication complexity but has increased update time. In [25], a dynamic authenticated data structure called RSA tree is presented that achieves constant query time (i.e., time to construct the proof), constant proof size and sublinear ($O(n^\epsilon)$) update time. One can easily combine an RSA tree with ranks (by explicitly storing the rank in the internal nodes of the RSA tree), therefore being able to answer more challenges (i.e., $O(C \log n)$ challenges) without increasing the communication cost, since proof of one challenged block requires $O(1)$ bandwidth in [25]. Here one has to note that sending $O(C \log n)$ challenges either in [2,3] or in DPDP I would increase the communication complexity from $O(1)$ to $O(C \log n)$ and from $O(C \log n)$ to $O(C \log^2 n)$ respectively. The reason for sending more challenges is the fact that the probability of detection p increases as the number of the challenges increases, since $p = 1-(1-f)^C$, where C is the number of challenges and $f$ is the ratio of the tampered blocks. Therefore by applying [25] with ranks to implement DPDP, one can maintain all the complexities measures the same with DPDP I apart from update time, which is increased from $O(\log n)$ to $O(n^\epsilon)$ for some $0 < \epsilon < 1$, and provide a probability of detection equal to $1-(1-f)^{C \log n}$, dependent on the number of the blocks.

In [25], an $\epsilon$ is chosen between 0 and 1 and a tree structure** is built that has $O(1/\epsilon)$ levels, each node having degree $O(n^\epsilon)$. However, there is no notion of order in [25]. To introduce a notion of order assume that the elements lie at the leaves of the tree and view it as a B-tree with lower bound on the degree $t = 3n^\epsilon/4$ and therefore upper bound equal to $2t = 3n^\epsilon/2$, which are both viewed as constants. Therefore one can use known B-tree algorithms to do the updates with the difference that the tree is rebuilt whenever the number of the blocks of the file increases from n to 2n or decreases from n to n/4. When rebuilding, set the new constants for the degree of the tree. By the properties of the B-tree (all leaves lie at the same level), one can prove that it is not possible to change the number of the levels of the tree before a new rebuild takes place.

**The use of such a tree is dictated by the specific cryptographic primitive used.

To see this, suppose the file initially consists of n blocks. Suppose now, for contradiction that the number of the levels of the tree changes before a new rebuilt takes place. Note that a new rebuilt takes place when at least 3n/4 operations (insertions/deletions) take place. One can distinguish two cases:

1. If the number of the levels of the tree increases, that means that the number b of the added blocks is at least $n^{1+\epsilon}-n$. Since there is no rebuilt it should be the case that $b \le 3n/4$ and therefore that $n^{1+\epsilon}-n \le 3n/4$, which is a contradiction for large n;
2. If the number of the levels of the tree decreases, that means that the number b of the deleted blocks is at least $n-n^{1-\epsilon}$. Since there is no rebuilt it should be the case that $b \le 3n/4$, and therefore that $n-n^{1-\epsilon} \le 3n/4$, which is again a contradiction for large n.

Therefore before a big change happens in the tree, one can rebuild (by using the same ϵ and by changing the node degree) the tree and amortize. This is important, because the RSA tree structure works for trees that do not change their depth during updates, since the constant proof complexity comes from the fact that the depth is not a function of the elements in the structure (unlike B-trees), but is always maintained to be a constant. Since now one is using a provably secure authenticated data structure based on [25] to secure the tags (where security is proved based on the strong RSA assumption), one has the following result:

Theorem 1.1
Assume the strong RSA assumption and the factoring assumption hold. The dynamic provable data possession scheme presented in this section (DPDP II) for a file consisting of n blocks has the following properties, where $f$ is the ratio of the number of tampered blocks over the total number of blocks of the file:
1. It is secure according to Definition 3;
2. The probability of detecting a tampered block while keeping the communication complexity $O(\log n)$ is $1-(1-f)^C$, where $C=O(\log n)$ is the number of the blocks challenged;
3. The amortized update time is $O(n^\epsilon)$ at the server for some $0<\epsilon<1$ and $O(1)$ at the client;
4. The query time at the server, the verification time at the client and the communication complexity for challenging C random blocks is $O(C)$.
5. The client uses $O(1)$ space;
6. The server uses $O(n)$ space.

7. Extensions and Applications

The benefits of the DPDP scheme—unlimited updates, and the ability to insert and delete data blocks at any point in a file—allow more natural use in distributed applications than in previous work. Here are described extensions to the basic scheme that employ additional layers of authenticated dictionaries (skip lists) to store hierarchical, application-specific metadata for use in applications such as networked storage and version control. In the extensions described below, the use case and storage guarantees are the same as before: a client would like to store data on an untrusted server, retaining only $O(1)$ space, with the ability to prove possession and integrity of all application data and metadata. To the best of the inventors' knowledge, these are the first efficient constructions for outsourced storage that provide file system and versioning semantics along with proof of possession. In Section 8, it is shown that such systems are efficient and practical.

Variable-Sized Blocks.

Although the scheme enables updates that insert, modify and delete whole blocks of data without affecting neighboring blocks, some applications or filesystems may more naturally wish to perform updates that do not cleanly map to fixed-size block boundaries. For example, an update which added or removed a line in a text file would require modifying each of the blocks in the file after the change, so that data in later blocks could still be accessed easily by byte offset (by calculating the corresponding block index). Under such a naive scheme, whole-block updates are inefficient, since new tags and proofs must be generated for every block following the updated one. A more complicated solution based solely on existing constructions could store block-to-byte tables in a "special" lookup block.

However, one can easily augment the ranking scheme to support variable-sized updates without changing unaffected blocks. Recall that the ranking scheme assigns each internal skip list node u a rank $r(u)$ equivalent to the number of leaf nodes (data blocks) reachable from the subtree rooted at u; leaves (blocks) are implicitly assigned a rank value of 1. Variable-sized blocks are supported by defining a leaf node's rank to be equal to the size of its associated block (e.g., in bytes). Each internal node, in turn, is assigned a rank equivalent to the amount of bytes reachable below it. Queries and proofs proceed the same as before, except that ranks and intervals associated with the search path refer to byte offsets, not block indices, with updates phrased as, e.g., "insert m bytes at byte offset i". Such an update would require changing only the block containing the data at byte index i. Similarly, modifications and deletions affect only those blocks spanned by the range of bytes specified in the update.

Directory Hierarchies.

Figure 9:
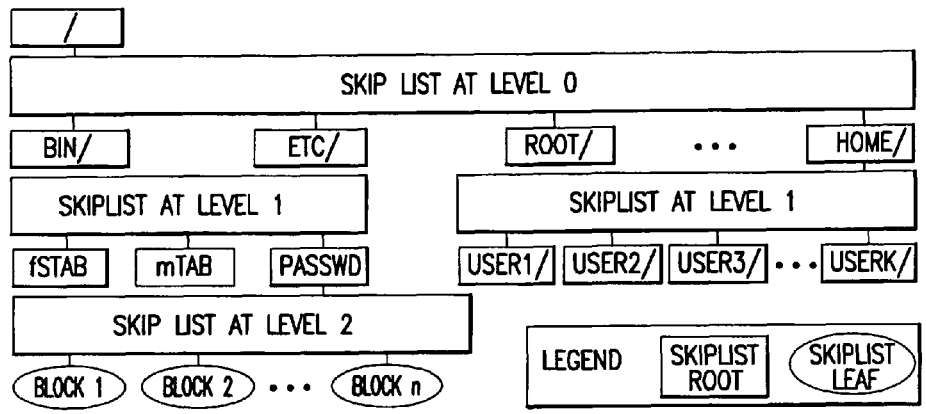
FIG. 9 shows an exemplary file system skip list with blocks as leaves, directories and files as roots of nested skip lists.

One can also extend the DPDP scheme for use in authenticated storage systems consisting of multiple files within a directory hierarchy. The key idea is to place the root of each file's rank-based skip list (from the single-file scheme) as the leaves of a parent dictionary which is used to map file names to files. Using key-based authenticated dictionaries [24] allows one to chain the proofs and update operations through the entire directory hierarchy; each directory is represented as a key-based skip list with leaves for each file or subdirectory it contains. Thus one can use these dictionaries in a nested manner, with the basis of the topmost dictionary as the root of the file system, and at the bottom, leaves for the tags associated with blocks of data (as depicted in FIG. 9).

This extension provides added flexibility for multi-user environments. Consider a system administrator who employs an untrusted storage provider. The administrator can keep the skip list basis corresponding to the topmost directory, and use it to periodically check the integrity of the whole file system. Each user can keep the skip list basis corresponding to her home directory, and use it to independently check the integrity of the directory hierarchy rooted at that basis, at any time and without need for cooperation from the administrator.

Since the basis of a skip list at level i is a leaf of another skip list at level i−1 in the hierarchy, upper levels of the hierarchy must be updated with each update to the lower levels. Still, the proof complexity stays relatively low: if n is the maximum number of leaves in each skip list, and the depth of the directory structure is d, then proofs on the whole file system have size and computation time of $O(d \log n)$. In many systems, d will be a very small constant.

Version Control.

One can build on the extensions further to efficiently support versioning systems (e.g., a CVS repository, or versioning filesystem). Such a system can be supported by adding another additional layer of key-based authenticated dictionaries [24], keyed by revision number (e.g., an indication of the revision), between the dictionaries for each file's directory and its data, chaining proofs as in previous extensions. (See FIG. 10 for an illustration.) As before, the client need only store the topmost basis; thus one can support a versioning system for a single file with only $O(1)$ storage at the client and $O(\log n+\log v)$ proof complexity, where v is the number of the file versions. For a versioning system spanning multiple directories, given v versions, and d the depth of the directory hierarchy, the proof complexity for the versioning file system will be $O(d(\log n+\log v))$.

The server may implement its method of block storage independently from the dictionary structures used to authenticate data; it need not physically duplicate each block of data that appears in each new version. However, as described, this extension requires the addition of a new rank-based dictionary representing file data for each new revision added (since this dictionary is placed at the leaf of each file's version dictionary). In order to be more space-efficient, one could use persistent authenticated skip lists [1] along with the rank mechanism. These persistent data structures handle skip list updates by adding new nodes for those affected by an update (nodes appearing along the search path), while preserving old internal nodes and roots corresponding to previous versions of the structure before each update. Thus, instead of replicating the entire skip list for each new version, the server stores only the nodes corresponding to blocks affected by it.

8. Performance Evaluation

The performance of the DPDP I scheme (Section 4) is evaluated in terms of communication and computational overhead, in order to determine the price of dynamism over static PDP. For ease of comparison, this evaluation uses the same scenario as in PDP [2], where a server wishes to prove possession of a 1 GB file. As observed in [2], detecting a 1% fraction of incorrect data with 99% confidence requires challenging a constant number of 460 blocks; the same number of challenges is used for comparison.

Figure 6:
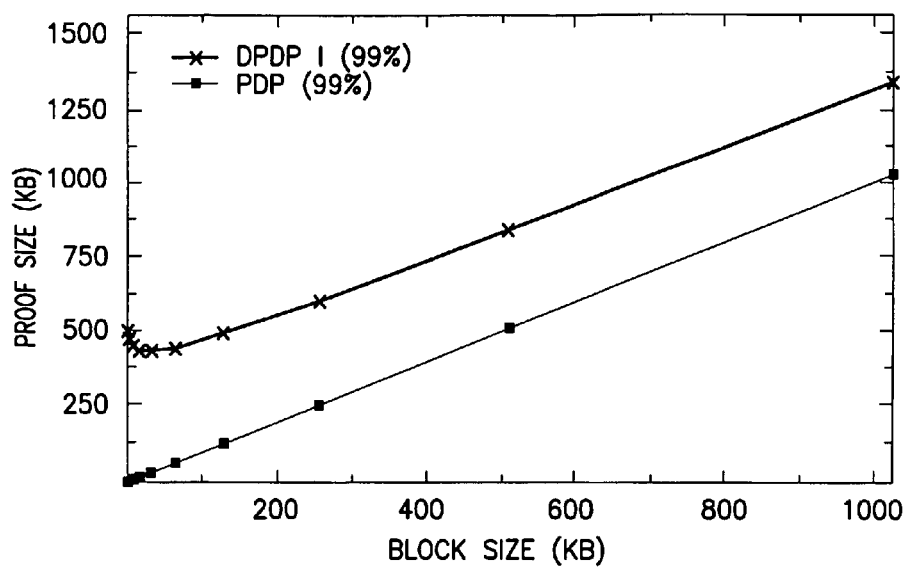
FIG. 6 shows expected size of proofs of possession under the instant scheme on a 1 GB file, for 99% probability of detecting misbehavior.
Figure 7:
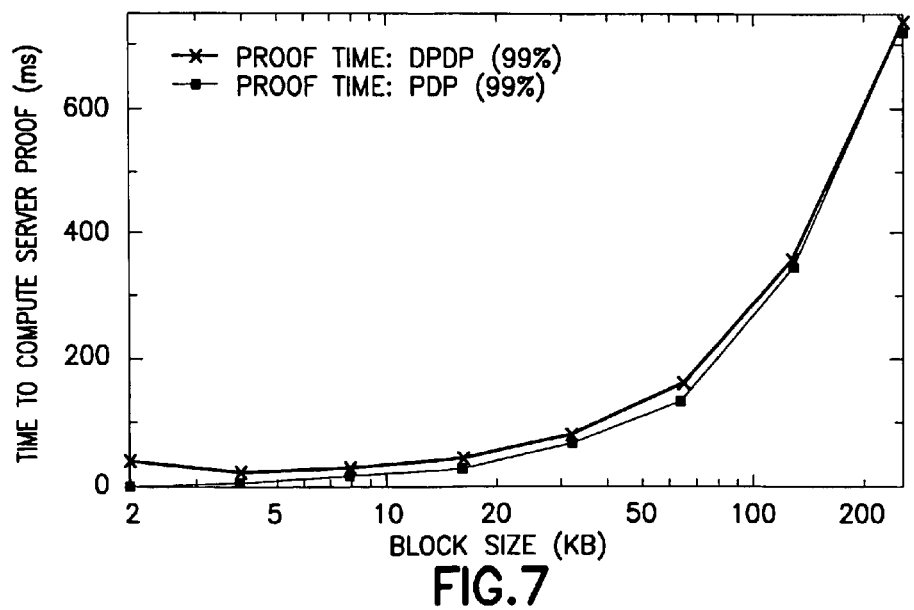
FIG. 7 depicts computation time required by the server in response to a challenge for a 1 GB file, with 99% probability of detecting misbehavior.

FIG. 6 shows expected size of proofs of possession under the instant scheme on a 1 GB file, for 99% probability of detecting misbehavior. FIG. 7 depicts computation time required by the server in response to a challenge for a 1 GB file, with 99% probability of detecting misbehavior.

In FIG. 6, a DPDP proof consists of responses to 460 authenticated skip list queries, combined with a single verification block $M=\Sigma a_i m_i$, which grows linearly with the block size. The size of this block M is the same as that used by the PDP scheme in [2]*, and is thus represented by the line labeled PDP. The distance between this line and those for the DPDP I scheme represents communication overhead—the price of dynamism—which comes from the skip list query responses (illustrated in FIG. 3**). Each response contains on average 1.5 log n rows, so the total size decreases exponentially (but slowly) with increasing block size, providing near-constant overhead except at very small block sizes.

***Multiple versions of the scheme are presented. The version without the knowledge of exponent assumption and the random oracle actually sends this M; other versions only compute it.

Next, measure the computational overhead required by a server in answering challenges. FIG. 7 presents the results of these experiments (averaged from 5 trials), which were performed on an AMD Athlon X2 3800+ system with 2 GHz CPU and 2 GB of RAM. As above, one computes the time required by the scheme for a 1 GB file under varying block sizes, providing 99% confidence. As shown, performance is dominated by computing M and increases linearly with the block size; note that static PDP [2] must also compute this M in response to the challenge. Thus the computational price of dynamism—time spent traversing the skip list and building proofs—while logarithmic in the number of blocks, is extremely low in practice: even for a 1 GB file with a million blocks of size 1 KB, computing the proof for 460 challenged blocks (achieving 99% confidence) requires less than 40 ms to compute in total (as small as 13 ms with larger blocks). In other experiments it was found that even when the server is not I/O bound (i.e., when computing M from memory) the computational cost was nearly the same.

These two figures together point to an optimal choice of block size that best minimizes total communication cost and computation overhead for a 1 GB file: a block size of 16 KB is best for 99% confidence, resulting in a proof size of 289 KB and 436 KB, and computational overhead of 30 ms, respectively. They also show that the price of dynamism due to the novel skip list scheme requires only a small amount of overhead compared with the existing PDP scheme.

Version Control Extension.

Next an application is evaluated that suits the scheme's ability to efficiently handle and prove updates to versioned, hierarchical resources. Public CVS repositories offer a useful benchmark to assess the performance of the version control system described in Section 7. Using CVS repositories for the Rsync [27], Samba [27] and Tcl [23] projects, retrieve the sequence of updates from the RCS source of each file in each repository's main branch. RCS updates come in two types: "insert m lines at line n" or "delete m lines starting at line n". For this evaluation, consider a scenario where queries and proofs descend a search path through hierarchical authenticated dictionaries corresponding (in order) to the directory structure, history of versions for each file, and finally to the source-controlled lines of each file (depicted in FIG. 10). Use variable-sized data blocks, but for simplicity, assume a naive scheme where each line of a file is assigned its own block; a smarter block-allocation scheme that collects contiguous lines during updates would yield fewer blocks, further reducing the overhead of such a system.

FIG. 5 presents performance characteristics of three public CVS repositories under the scheme; while an authenticated CVS system has not been implemented, the server overhead required for proofs of possession for each repository are reported. Here, "commits" refer to individual CVS checkins, each of which establish a new version, adding a new leaf to the version dictionary for that file; "updates" describe the number of inserts or deletes required for each commit. Total statistics sum the number of lines (blocks) and kilobytes required to store all inserted lines across all versions, even after they have been removed from the file by later deletions (since the server continues to store them).

One can use these figures to evaluate the performance of a proof of possession under the DPDP I scheme: as described in Section 7, the cost of authenticating different versions of files within a directory hierarchy requires time and space complexity corresponding to the depth of the skip list hierarchy, and the width of each skip list encountered during the Prove procedure. As in the previous evaluation, "Proof size, 99%" in FIG. 5 refers to the size of a response to 460 challenges over an entire repository (all directories, files, and versions). This figure shows that clients of an untrusted CVS server—even those storing none of the versioned resources locally—can query the server to prove possession of the repository using just a small fraction (1% to 6%) of the bandwidth required to download the entire repository. "Proof size and time per commit" refer to a proof sent by the server to prove that a single commit (made up of, on average, about a dozen updates) was performed successfully, representing the typical use case. These commit proofs are very small (15 KB to 21 KB) and fast to compute, rendering them practical even though they are required for each commit. Experiments show that the DPDP scheme is efficient and practical for use in distributed applications.

9. Additional Notes

Skip Lists.

The skip list data structure (see FIG. 8) is an efficient means for storing a set S of elements from an ordered universe. It supports the operations find(x) (determine whether element x is in S), insert(x) (insert element x in S) and delete(x) (remove element x from S). It stores a set S of elements in a series of linked lists $S_0, S_1, S_2, \ldots, S_t$. The base list, $S_0$, stores all the elements of S in order, as well as sentinels associated with the special elements $-\infty$ and $+\infty$. Each successive list $S_i$, for $i \geq 1$, stores a sample of the elements from $S_{i-1}$. To define the sample from one level to the next, choose each element of $S_{i-1}$ at random with probability ½ to be in the list $S_i$.

Figure 8:
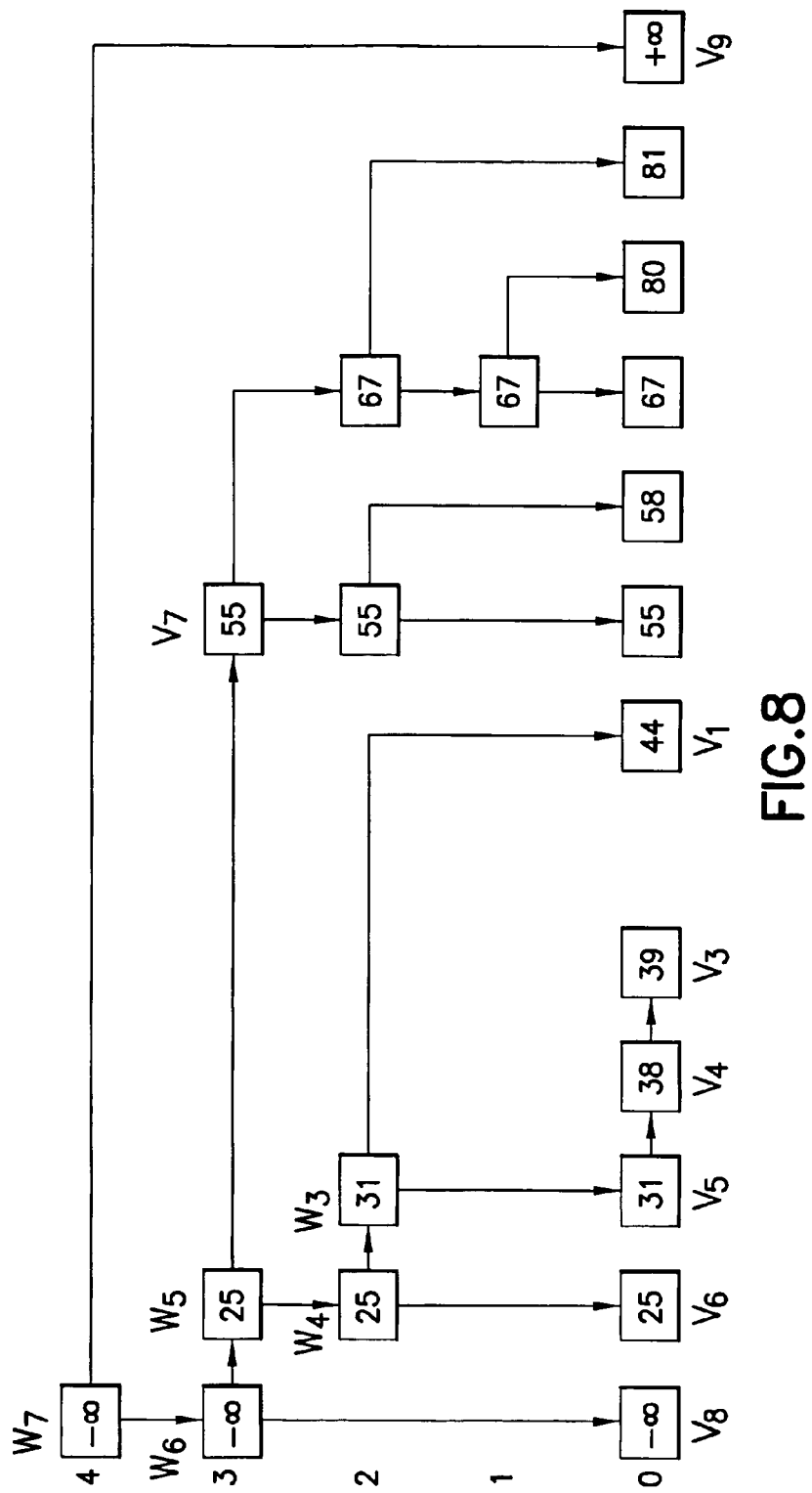
FIG. 8 shows an exemplary skip list used to store an ordered set.

FIG. 8 shows an exemplary skip list used to store the ordered set {25,31,38,39,44,55,58,67,80,81}. The proof for the existence of element 39 (and for the absence of element 40) as proposed in [10] is the set {44,39,38,31, $f(v_1), f(v_6), f(v_7), f(v_8), f(v_9)$}. The recomputation of $f(w_7)$ is performed by sequentially applying $h(\bullet,\bullet)$ to this set.

Extensions.

FIG. 9 shows an exemplary file system skip list with blocks as leaves, directories and files as roots of nested skip lists.

Figure 10:
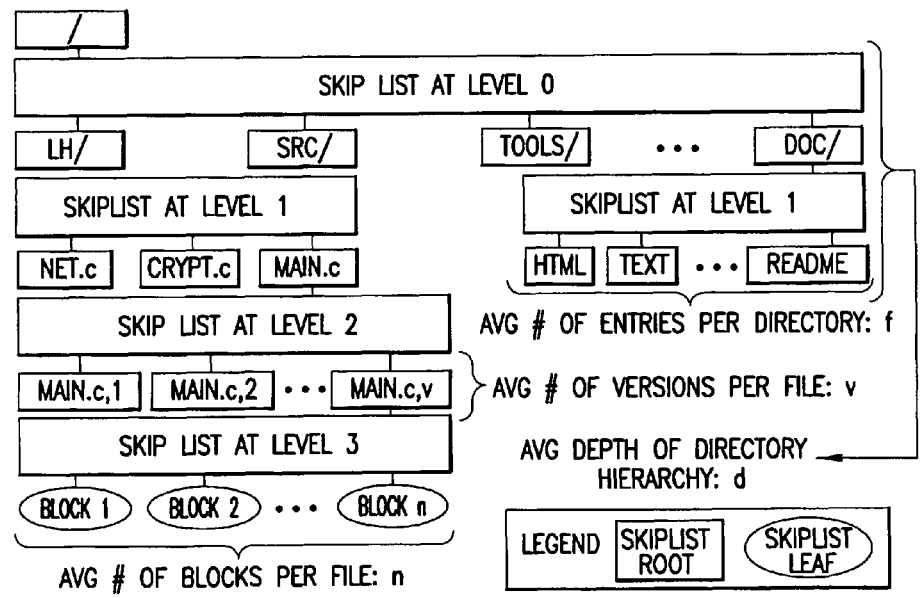
FIG. 10 illustrates an exemplary version control file system.

FIG. 10 illustrates an exemplary version control file system. Notice the additional level of skiplists for holding versions of a file. To eliminate redundancy at the version level, persistent authenticated skip lists could be used [1]: the complexity of these proofs will then be O(log n+log v+d log $f$).

For purposes of clarity, a few definitions will be discussed below. It is believed that these parallel what is known to one of ordinary skill in the art, and this conventional meaning/understanding is not controverted by the below definitions.

A skip list is a data structure for storing a sorted list of items using a hierarchy of linked lists that connect subsequences of the items. These auxiliary lists enable item lookup with greater efficiency as compared with a balanced binary search tree (i.e., with a number of probes proportional to log n instead of n).

A skip list is built in layers, also referred to herein as levels. A search for a target element (e.g., value) begins at the head element (i.e., root node) in the top list and proceeds horizontally until the current element is greater than or equal to the target. If the current element is equal to the target, it has been found. If the current element is greater than the target, the procedure is repeated after returning to the previous element and dropping down vertically to the next lower list (the next level down). Note that nodes of a skip list generally correspond to an interval of values and, thus, nodes of a skip list may be seen to have an interval value associated with the respective node.

RSA is an algorithm for public-key cryptography [25].

Hash trees or Merkle trees are a type of data structure which contains a tree of summary information about a larger piece of data (e.g., a file) used to verify its contents. A hash tree is a tree of hashes in which the leaves are hashes of data blocks in, for instance, a file or set of files. Nodes further up in the tree are the hashes of their respective children. Usually, a cryptographic hash function such as SHA-1, Whirlpool, or Tiger is used for the hashing. If the hash tree only needs to protect against unintentional damage, much less secure checksums such as cyclic redundancy checks (CRCs) can be used.

The top of a hash tree has a top hash (or root hash or master hash). As an example, before downloading a file on a p2p network, in most cases the top hash is acquired from a trusted source, for instance a friend or a web site that is known to have good recommendations of files to download. When the top hash is available, the hash tree can be received from any non-trusted source, such as any peer in the p2p network. Then, the received hash tree is checked against the trusted top hash, and if the hash tree is damaged or fake, another hash tree from another source will be tried until the program finds one that matches the top hash.

A hash function is a well-defined procedure or mathematical function that converts a large amount of data into a small datum (e.g., a single integer) that may be used as an index (e.g., in an array or other data structure). Hash functions are often used to speed up table lookup or data comparison tasks.

The following is a list of exemplary cryptographic hashes: elf64, HAVAL, MD2, MD4, MD5, Radio Gatún, RIPEMD-64, RIPEMD-160, RIPEMD-320, SHA-1, SHA-256, SHA-384, SHA-512, Skein, Tiger and Whirlpool.

Note that any suitable hash function may be used with the exemplary embodiments of the invention. In some exemplary embodiments, the selection of a particular hash function may depend on the intended use and/or desired attributes of the system (e.g., in view of the attributes of the hash function, such as length and cost, for example).

Both a skip list and a hash tree (the "list/tree") are considered herein to be organizational structures having a generally tree-like structure comprised of nodes. A root node (e.g., located at the top or root of the hash tree or at the top left or root of the skip list) leads to one or more internal nodes and/or zero or more lead nodes. The internal nodes lead to zero or more other internal nodes and/or one or more leaf nodes. The leaf nodes are located at the very bottom of the list/tree (e.g., at the bottommost level/layer). Data (e.g., one or more files, collections of files, directories, file systems) or portions of data are stored in accordance with the leaf nodes, as noted above. The root node, internal nodes and/or leaf nodes may lead to another node on the same level/layer. The nodes of the list/tree each have a hash value associated with the node. For purposes of convenience and discussion, the nodes of the list/tree may be referred to using a label (e.g., $v_i$ or $w_j$). Two nodes are considered linked within the list/tree if there is a connection pointing from one node to the other node.

In some exemplary embodiments, links between nodes are either pointing from one node to another node at the same level or pointing from one node to another node at a lower level.

10. References

Various references that may be germane to this application include the following, also as cited elsewhere herein.

[1] A. Anagnostopoulos, M. Goodrich, and R. Tamassia. Persistent Authenticated Dictionaries and Their Applications. *ISC*, pages 379-393, 2001.

[2] G. Ateniese, R. Burns, R. Curtmola, J. Herring, L. Kissner, Z. Peterson, and D. Song. Provable data possession at untrusted stores. In *ACM CCS*, pages 598-609, 2007.

[3] G. Ateniese, R. D. Pietro, L. V. Mancini, and G. Tsudik. Scalable and efficient provable data possession. SecureComm, 2008.

[4] M. Blum, W. Evans, P. Gemmell, S. Kannan, and M. Naor. Checking the Correctness of Memories. *Algorithmica*, 12(2):225-244, 1994.

[5] D. E. Clarke, S. Devadas, M. van Dijk, B. Gassend, and G. E. Suh. Incremental multiset hash functions and their application to memory integrity checking. In *ASIACRYPT, pages* 188-207, 2003.

[6] Y. Dodis, S. Vadhan, and D. Wichs. Proofs of retrievability via hardness amplification. In *TCC*, 2009.

[7] C. Dwork, M. Naor, G. N. Rothblum, and V. Vaikuntanathan. How efficient can memory checking be?, 2008. Manuscript.

[8] D. L. Gazzoni and P. S. L. M. Barreto. Demonstrating data possession and uncheatable data transfer. Cryptology ePrint Archive, Report 2006/150, 2006.

[9] M. T. Goodrich, C. Papamanthou, R. Tamassia, and N. Triandopoulos. Athos: Efficient authentication of outsourced file systems. In *ISC*, pages 80-96, 2008.

[10] M. T. Goodrich, R. Tamassia, and A. Schwerin. Implementation of an authenticated dictionary with skip lists and commutative hashing. In *DISCEX II*, pages 68-82, 2001.
[11] A. Juels and B. S. Kaliski. PORs: Proofs of retrievability for large files. In *ACM CCS*, pages 584-597, 2007.
[12] M. Kallahalla, E. Riedel, R. Swaminathan, Q. Wang, and K. Fu. Plutus: Scalable secure file sharing on untrusted storage. *FAST*, pages 29-42, 2003.
[13] J. Kubiatowicz, D. Bindel, Y. Chen, S. Czerwinski, P. Eaton, D. Geels, R. Gummadi, S. Rhea, H. Weatherspoon, W. Weimer, C. Wells, and B. Zhao. Oceanstore: an architecture for global-scale persistent storage. *SIGPLAN Not.*, 35(11):190-201, 2000.
[14] F. Li, M. Hadjieleftheriou, G. Kollios, and L. Reyzin. Dynamic authenticated index structures for outsourced databases. In *SIGMOD*, pages 121-132, 2006.
[15] J. Li, M. Krohn, D. Mazieres, and D. Shasha. Secure Untrusted Data Repository (SUNDR). *OSDI*, pages 121-136, 2004.
[16] U. Maheshwari, R. Vingralek, and W. Shapiro. How to build a trusted database system on untrusted storage. In *OSDI*, pages 10-26, Berkeley, Calif., USA, 2000. USENIX Association.
[17] R. Merkle. A digital signature based on a conventional encryption function. *LNCS*, 293:369-378, 1987.
[18] G. Miller. Riemann's hypothesis and tests for primality. In *STOC*, pages 234-239, 1975.
[19] A. Muthitacharoen, R. Morris, T. Gil, and B. Chen. Ivy: A Read/Write Peer-to-Peer File System. *OSDI*, pages 31-44, 2002.
[20] M. Naor and K. Nissim. Certificate revocation and certificate update. In *USENIX Security*, pages 17-17, 1998.
[21] M. Naor and G. N. Rothblum. The complexity of online memory checking. In *FOCS*, pages 573-584, 2005.
[22] A. Oprea, M. Reiter, and K. Yang. Space-Efficient Block Storage Integrity. *NDSS*, 2005.
[23] J. Ousterhout. Tcl/tk. http://www.tcl.tk/.
[24] C. Papamanthou and R. Tamassia. Time and space efficient algorithms for two-party authenticated data structures. In *ICICS*, pages 1-15, 2007.
[25] C. Papamanthou, R. Tamassia, and N. Triandopoulos. Authenticated hash tables. In *ACM CCS*, pages 437-448, 2008.
[26] W. Pugh. Skip lists: A probabilistic alternative to balanced trees. *Commun. ACM*, 33(6):668-676, 1990.
[27] Samba. Samba.org CVS repository. http://cvs.samba.org/cgi-bin/cvsweb/.
[28] T. Schwarz and E. Miller. Store, Forget, and Check: Using Algebraic Signatures to Check Remotely Administered Storage. *ICDCS*, page 12, 2006.
[29] F. Sebe, A. Martinez-Balleste, Y. Deswarte, J. Domingo-Ferre, and J.-J. Quisquater. Time-bounded remote file integrity checking. Technical Report 04429, LAAS, July 2004.
[30] H. Shacham and B. Waters. Compact proofs of retrievability. In *ASIACRYPT*, 2008.
[31] R. Tamassia. Authenticated data structures. In *ESA*, pages 2-5, 2003.
[32] R. Tamassia and N. Triandopoulos. Computational bounds on hierarchical data processing with applications to information security. In *ICALP*, pages 153-165, 2005.
[33] U.S. Pat. No. 7,257,711 to Goodrich et al.

11. Further Exemplary Embodiments

Below are described various further non-limiting, exemplary embodiments of the invention. It should be noted that the exemplary embodiments described below may be utilized in conjunction with one or more of the aspects and/or attributes described above, and in any suitable and/or practicable combination.

Figure 11:
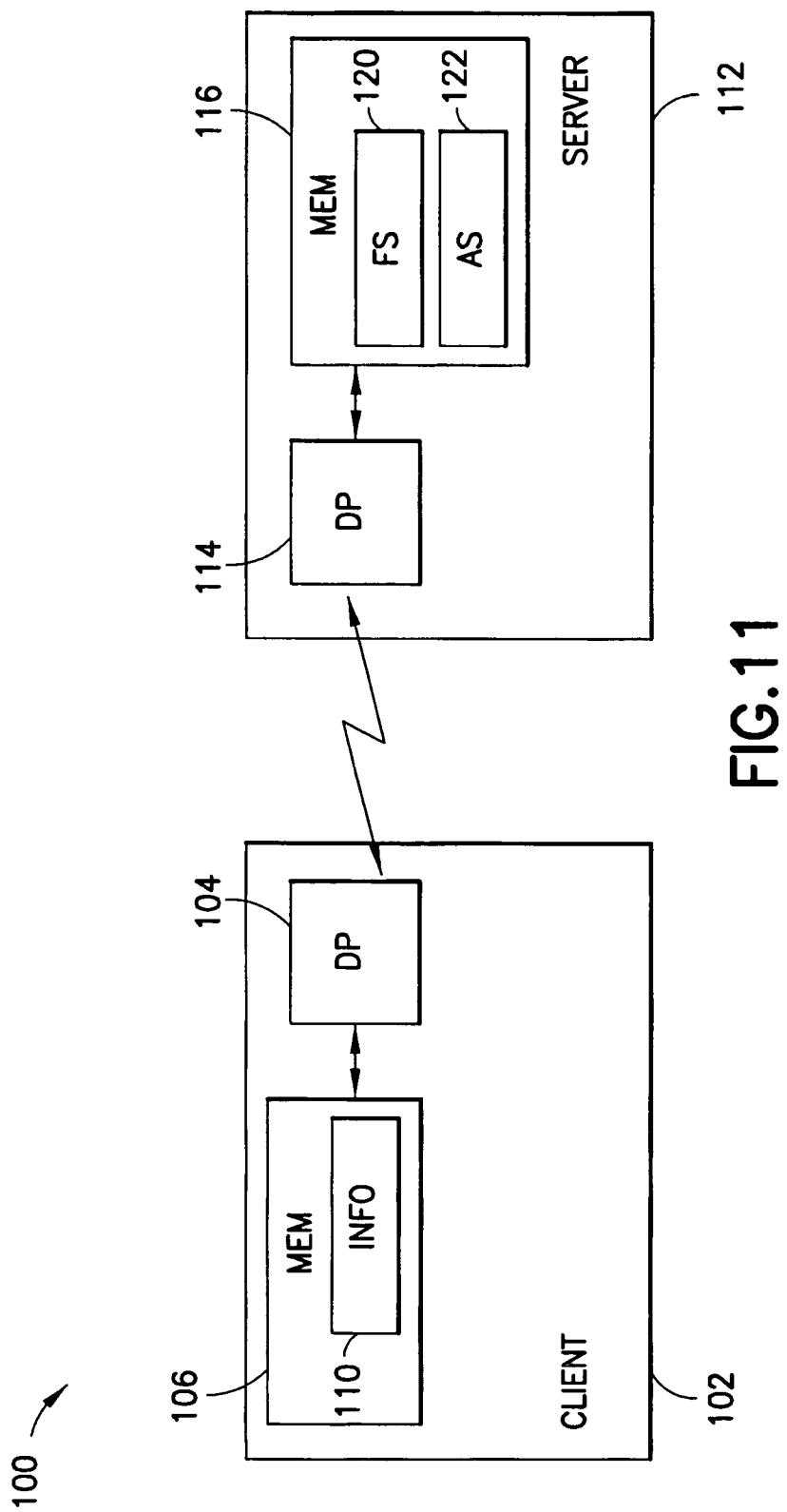
FIG. 11 illustrates a simplified block diagram of various electronic devices that are suitable for use in practicing the exemplary embodiments of this invention.

FIG. 11 illustrates a simplified block diagram of various exemplary electronic devices that are suitable for use in practicing the exemplary embodiments of this invention. FIG. 11 shows a system 100 having a client 102 and a server 112.

The client 102 has at least one data processor (DP) 104 and at least one memory (MEM) 106 coupled to the DP 104. The client 102 is configured for bidirectional communication with the server 412, for example, using one or more communication components, such as a transceiver or modem (not shown). The MEM 106 stores information (INFO) 110 in accordance with exemplary embodiments of the invention, as further described herein. As non-limiting examples, the INFO 110 may comprise one or more files, one or more dictionaries (e.g., authenticated dictionaries), one or more data files (e.g., skip lists, skip list information, hash values) used for security purposes (e.g., authentication, verification), one or more file systems or file collections and/or other information, data or files, as non-limiting examples. The client 102 may comprise any suitable electronic device, including stationary and portable computers, as non-limiting examples. The client 102 may comprise additional components and/or functions. For example, the client 102 may include one or more user interface (UI) elements, such as a display, a keyboard, a mouse or any other such UI components, as non-limiting examples. As a further non-limiting example, the client 102 may comprise a communication component (e.g., a transceiver, a modem) that enables communication with one or more other devices, such as the server 112, for example.

The server 112 has at least one data processor (DP) 114 and at least one memory (MEM) 116 coupled to the DP 114. The server 112 is configured for bidirectional communication with the client 402, for example, using one or more communication components, such as a transceiver or modem (not shown). The MEM 116 stores a file system (FS) 120 and an authentication service (AS) 122 in accordance with exemplary embodiments of the invention, as further described herein. In some exemplary embodiments, the functionality of the FS 120 and AS 122 may be stored in or provided by a single component, such as a memory, a circuit, an integrated circuit or a processor, as non-limiting examples. Note that in other exemplary embodiments, the functionality of the FS 120 and AS 122 may be stored in or provided by separate components (e.g., two or more memories, two or more circuits, two or more integrated circuits, two or more processors). The MEM 116 of the server 112 may store additional information or data, such as one or more files, one or more dictionaries (e.g., authenticated dictionaries), one or more data files (e.g., skip lists, skip list information, hash values) used for security purposes (e.g., authentication, verification), one or more file systems or file collections and/or other information, data or files, as non-limiting examples. The server 112 may comprise any suitable electronic device, including stationary and portable computers, as non-limiting examples. The server 112 may comprise additional components and/or functions. For example, the server 112 may include one or more user interface (UI) elements, such as a display, a keyboard, a mouse or any other such UI components, as non-limiting examples. As a further non-limiting example, the server 112 may comprise a communication component (e.g., a transceiver, a modem) that enables communication with one or more other devices, such as the client 102, for example. In some exemplary embodiments, the server 112 may be considered an untrusted remote server storing data on behalf of and for access by the client 102.

As a non-limiting example, the server 112 may store data (e.g., one or more file systems) using one or more skip lists and/or hashing schemes (e.g., hash trees), as non-limiting examples. As a non-limiting example, the client 102 may be configured to access data stored by the server 112, such as data stored in one or more skip lists, for example. In further exemplary embodiments, there may be one or more nodes (e.g., relay nodes) disposed between the client 102 and the server 112. In such exemplary embodiments, the client 102 may communicate with the server 112 via the one or more intermediate nodes.

The exemplary embodiments of this invention may be carried out by computer software implemented by the one or more of the DPs 104, 114 or by hardware, or by a combination of hardware and software. As a non-limiting example, the exemplary embodiments of this invention may be implemented by one or more integrated circuits. The MEMs 106, 116 may be of any type appropriate to the technical environment and may be implemented using any appropriate data storage technology, such as optical memory devices, magnetic memory devices, semiconductor-based memory devices, fixed memory and removable memory, as non-limiting examples. The DPs 104, 114 may be of any type appropriate to the technical environment, and may encompass one or more of microprocessors, general purpose computers, special purpose computers and processors based on a multi-core architecture, as non-limiting examples.

Exemplary embodiments of the invention or various aspects thereof, such as the authentication service, as a non-limiting example, may be implemented as a computer program stored by the respective MEM 106, 116 and executable by the respective DP 104, 114.

Below are further descriptions of various non-limiting, exemplary embodiments of the invention. The below-described exemplary embodiments are numbered separately for clarity purposes. This numbering should not be construed as entirely separating the various exemplary embodiments since aspects of one or more exemplary embodiments may be practiced in conjunction with one or more other aspects or exemplary embodiments. The exemplary embodiments of the invention, including those described immediately below, may be practiced, utilized or implemented in any combination (e.g., any combination that is practicable, feasible and/or suitable) and are not limited to only those combinations included in the appended claims and/or described herein.

(1) In one exemplary embodiment of the invention, an apparatus comprising: at least one memory configured to store data; and at least one processor configured to perform operations on the stored data, where the data comprises at least one file organized as a plurality of blocks with each block comprising at least a portion of the at least one file, where the apparatus is configured to maintain a skip list corresponding to the stored data, where the skip list comprises an ordered tree structure having a root node, at least one internal node and at least one leaf node, where each of the at least one leaf nodes corresponds to a block of the plurality of blocks, where each node of the skip list has an associated rank value corresponding to a size of a subtree of the skip list rooted at the node, where the skip list employs a hashing scheme to assign a hash value to each node of the skip list, where the hash value of the root node and the at least one internal node is computed from a level of the node within the skip list, the rank value of the node within the skip list and an interval between the node and another linked node that is to the right of or below the node, where the hash value of the at least one leaf node is computed from a level of the at least one leaf node within the skip list, the rank value of the least one leaf node and an interval associated with the at least one leaf node.

An apparatus as above, where the hash value $f(v)$ of a node v in the skip list is computed as follows: if $l(v)>0$ then $f(v)=h(A\|I(dwn(v))\|f(dwn(v)), A\|I(rgt(v))\|f(rgt(v)))$; if $l(v)=0$ and $rgt(v)=null$ then $f(v)=h(A\|I(v)\|T(dat(v)), A\|I(suc(v))\|T(dat(suc(v))))$; if $l(v)=0$ and $rgt(v)\neq null$ then $f(v)=h(A\|I(v)\|T(dat(v)), A\|I(rgt(v))\|f(rgt(v)))$, where $A=l(v)\|r(v)$, $\|$ denotes a concatenation operator, $suc(v)$ is a successor node of v, $dat(v)$ denotes data at node v, $I(v)$ denotes an interval corresponding to node v, $r(v)$ denotes the rank of node v, $l(v)$ is the level of node v within the skip list, $rgt(v)$ is a first pointer indicating a next node to the right of node v and $dwn(v)$ is a second pointer indicating a next node below node v.

An apparatus as in any above, where a first operation performed by the at least one processor comprises constructing a proof $\Pi(i)$ for a block i as follows: determine a reverse search path $v_1, v_2, \ldots, v_m$ of nodes in the skip list for the block i; and return $\Pi(i)=\{A(v_1), A(v_2), \ldots, A(v_m)\}$, where $A(v_j)$ is a 4-tuple for a node $v_j$ of the skip list, $f(v_j)$ is the hash value for the node $v_j$ and $A(v_j)$ includes the level $l(v_j)$, the rank $r(v_j)$, an interval $I(v_j)$ for the node $v_j$ and the hash value $f(v_j)$.

An apparatus as in any above, where a second operation performed by the at least one processor comprises verifying the proof $I(i)$ returned by the first operation as follows: if $\lambda(\Pi(i))=M_c$ then return ACCEPT; else return REJECT, where $M_c$ is locally stored metadata, $\lambda(\Pi(i))=\lambda(A(v_1), A(v_2), \ldots, A(v_m))$ and denotes a last element of $S(A(v_1), A(v_2), \ldots, A(v_m))$, $S(A(v_1), A(v_2), \ldots, A(v_m))=(L,n,[1,n], f(s))$, L is a maximum level of the skip list, n is a number of stored items, $f(s)$ is the hash value of a top-leftmost node of the skip list, ACCEPT indicates acceptance of the proof $\Pi(i)$ and REJECT indicates rejection of the proof $\Pi(i)$.

An apparatus as in any above, where a third operation performed by the at least one processor comprises updating the skip list based on an update operation upd as follows: if $upd=ins$ then insert $T(m_k)$ after block i in the skip list; if $upd=del$ then delete block i in the skip list; if $upd=modify$ then set $T(m_i)=T$ in the skip list; for all affected nodes v, update $A(v), f(v)$ to $A'(v), f'(v)$; return $\{f'(s), \Pi(i)\}$, where $T(m_i)$ is a representation of a modification for the block i, $m_k$ is a new block to be inserted in the skip list, $A'(v)$ is an updated 4-tuple for the node v, $f'(v)$ is an updated hash value for the node v and $f'(s)$ is an updated hash value of a top-leftmost node of the skip list.

An apparatus as in any above, where a fourth operation performed by the at least one processor comprises verifying an updated proof $\Pi'(i)$ corresponding to the update performed by the third operation as follows: if $\lambda(\Pi'(i))=M'_c$ then return ACCEPT; else return REJECT; where $M'_c$ is locally stored updated metadata, $\lambda(\Pi'(i))=\lambda(A'(v_1), A'(v_2), \ldots, A'(v_m))$ and denotes a last element of $S'(A'(v_1), A'(v_2), \ldots, A'(v_m))$, $S'(A'(v_1), A'(v_2), \ldots, A'(v_m))=(L,n',[1,n'], f'(s))$, L is a maximum level of the skip list, n' is an updated number of stored items, skip list ACCEPT indicates acceptance of the updated proof $\Pi'(i)$ and REJECT indicates rejection of the updated proof $\Pi'(i)$.

An apparatus as in any above, where the size of the subtree is measured as a number of leaf nodes reachable from the node or as a total block size of the blocks associated with the leaf nodes reachable from the node. An apparatus as in any above, where each leaf node of the skip list has an associated homomorphic tag that is a function of the associated block, wherein a tag size of the associated homomorphic tag is smaller than a block size of the associated block and the homomorphic tags enable blockless verification. An apparatus as in any above, where usage of the homomorphic tags enables a client to check the integrity of the at least one file (the data, the portions of the data associated with the blocks) by an operation performed on the homomorphic tags (e.g., the server performing an operation on the tags and sending a result to the client) and without the client downloading an entirety of the at least one file (without the client downloading the data or at least all of the data). An apparatus as in any above, where the rank value does not comprise a search key. An apparatus as in any above, where the at least one memory is further configured to store the skip list.

An apparatus as in any above, further comprising an input (e.g., means for receiving, such as a receiver or modem, as non-limiting examples) configured to receive an update instruction from a client. An apparatus as in any above, where the update instruction comprising an instruction to perform at least one of: modifying at least one block, deleting at least one block and inserting at least one new block. An apparatus as in any above, where the at least one processor is further configured to perform the update instruction on the skip list and obtain an updated skip list, an updated hash value for the root node and an update proof corresponding to the updated skip list. An apparatus as in any above, further comprising an output (e.g., means for sending, such as a transmitter or modem, as non-limiting examples) configured to send at least the update proof and the updated hash value of the root node to the client. An apparatus as in any above, where the update proof and the updated hash value of the root node enable the client to authenticate the performance of the update instruction by the apparatus.

An apparatus as in any above, further comprising an input (e.g., means for receiving, such as a receiver or modem, as non-limiting examples) configured to receive a challenge from a client. An apparatus as in any above, where the at least one processor is further configured to generate a challenge proof based on the received challenge. An apparatus as in any above, further comprising an output (e.g., means for sending, such as a transmitter or modem, as non-limiting examples) configured to send the challenge proof to the client. An apparatus as in any above, where the challenge proof enables the client to verify that at least a portion of the data stored by the apparatus is intact. An apparatus as in any above, where the apparatus comprises a remote untrusted server.

An apparatus as in any above, where the at least one file comprises a file system and the apparatus supports versioning file systems by use of at least one key-based authenticated dictionary, keyed by revision number, between one or more dictionaries for each file's directory and each file's data. An apparatus as in any above, where a block size of at least one block of the plurality of blocks is variable. An apparatus as in any above, where a respective block size for each block of the plurality of blocks is variable. An apparatus as in any above, further comprising one or more aspects of the exemplary embodiments of the invention as described in further detail herein.

(2) In another exemplary embodiment of the invention, a program storage device readable by a processor of an apparatus, tangibly embodying a program of instructions executable by the processor for performing operations, the operations comprising: storing data, where the data comprises at least one file organized as a plurality of blocks with each block comprising at least a portion of the at least one file; and maintaining a skip list corresponding to the stored data, where the skip list comprises an ordered tree structure having a root node, at least one internal node and at least one leaf node, where each of the at least one leaf nodes corresponds to a block of the plurality of blocks, where each node of the skip list has an associated rank value corresponding to a size of a subtree of the skip list rooted at the node, where the skip list comprises a skip list or a RSA tree, where the skip list employs a hashing scheme to assign a hash value to each node of the skip list, where the hash value of the root node and the at least one internal node is computed from a level of the node within the skip list, the rank value of the node within the skip list and an interval between the node and another linked node that is to the right of or below the node, where the hash value of the at least one leaf node is computed from a level of the at least one leaf node within the skip list, the rank value of the least one leaf node and an interval associated with the at least one leaf node.

A program storage device as above, further comprising one or more aspects of the exemplary embodiments of the invention as described in further detail herein.

Figure 12:
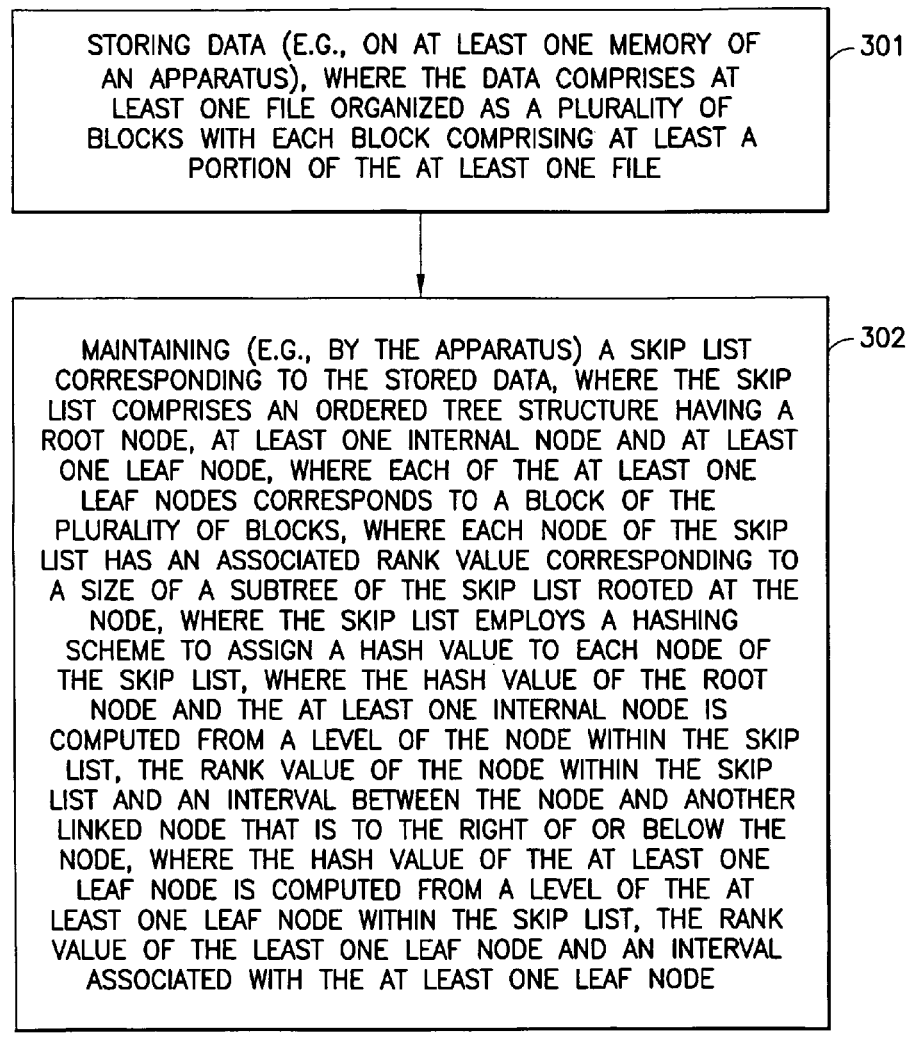
FIG. 12 depicts a flowchart illustrating one non-limiting example of a method for practicing the exemplary embodiments of this invention.

(3) In a further exemplary embodiment of the invention, and as illustrated in FIG. 12, a method comprising: storing data (e.g., on at least one memory of an apparatus), where the data comprises at least one file organized as a plurality of blocks with each block comprising at least a portion of the at least one file (301); and maintaining (e.g., by the apparatus) a skip list corresponding to the stored data (302), where the skip list comprises an ordered tree structure having a root node, at least one internal node and at least one leaf node, where each of the at least one leaf nodes corresponds to a block of the plurality of blocks, where each node of the skip list has an associated rank value corresponding to a size of a subtree of the skip list rooted at the node, where the skip list comprises a skip list or a RSA tree, where the skip list employs a hashing scheme to assign a hash value to each node of the skip list, where the hash value of the root node and the at least one internal node is computed from a level of the node within the skip list, the rank value of the node within the skip list and an interval between the node and another linked node that is to the right of or below the node, where the hash value of the at least one leaf node is computed from a level of the at least one leaf node within the skip list, the rank value of the least one leaf node and an interval associated with the at least one leaf node.

A method as above, further comprising one or more aspects of the exemplary embodiments of the invention as described in further detail herein.

(4) In another exemplary embodiment of the invention, an apparatus comprising: means for storing data (e.g., at least one memory), where the data comprises at least one file organized as a plurality of blocks with each block comprising at least a portion of the at least one file; and means for maintaining (e.g., at least one processor) a skip list corresponding to the stored data, where the skip list comprises an ordered tree structure having a root node, at least one internal node and at least one leaf node, where each of the at least one leaf nodes corresponds to a block of the plurality of blocks, where each node of the skip list has an associated rank value corresponding to a size of a subtree of the skip list rooted at the node, where the skip list comprises a skip list or a RSA tree, where the skip list employs a hashing scheme to assign a hash value to each node of the skip list, where the hash value of the root node and the at least one internal node is computed from a level of the node within the skip list, the rank value of the node within the skip list and an interval between the node and another linked node that is to the right of or below the node, where the hash value of the at least one leaf node is computed from a level of the at least one leaf node within the skip list, the rank value of the least one leaf node and an interval associated with the at least one leaf node.

An apparatus as above, where the means for storing comprises a storage device or at least one memory and the means for maintaining comprises at least one circuit or at least one processor. An apparatus as in any above, further comprising means for performing operations on the stored data. An apparatus as in any above, where the means for performing comprises at least one circuit or at least one processor. An apparatus as in any above, further comprising one or more aspects of the exemplary embodiments of the invention as described in further detail herein.

(5) In a further exemplary embodiment of the invention, an apparatus comprising: storage circuitry configured to store data, where the data comprises at least one file organized as a plurality of blocks with each block comprising at least a portion of the at least one file; and processing circuitry configured to maintain a skip list corresponding to the stored data, where the skip list comprises an ordered tree structure having a root node, at least one internal node and at least one leaf node, where each of the at least one leaf nodes corresponds to a block of the plurality of blocks, where each node of the skip list has an associated rank value corresponding to a size of a subtree of the skip list rooted at the node, where the skip list comprises a skip list or a RSA tree, where the skip list employs a hashing scheme to assign a hash value to each node of the skip list, where the hash value of the root node and the at least one internal node is computed from a level of the node within the skip list, the rank value of the node within the skip list and an interval between the node and another linked node that is to the right of or below the node, where the hash value of the at least one leaf node is computed from a level of the at least one leaf node within the skip list, the rank value of the least one leaf node and an interval associated with the at least one leaf node.

An apparatus as in any above, further comprising one or more aspects of the exemplary embodiments of the invention as described in further detail herein.

(6) In another exemplary embodiment of the invention, an apparatus comprising: at least one memory configured to store information; and at least one processor configured to perform operations with (e.g., on or using) the stored information, where the information relates to data comprising at least one file organized as a plurality of blocks with each block comprising at least a portion of the at least one file, where the apparatus is configured to perform operations with respect to (e.g., on or using) a skip list corresponding to the data, where the skip list comprises an ordered tree structure having a root node, at least one internal node and at least one leaf node, where each of the at least one leaf nodes corresponds to a block of the plurality of blocks, where each node of the skip list has an associated rank value corresponding to a size of a subtree of the skip list rooted at the node, where the skip list comprises a skip list or a RSA tree, where the skip list employs a hashing scheme to assign a hash value to each node of the skip list, where the hash value of the root node and the at least one internal node is computed from a level of the node within the skip list, the rank value of the node within the skip list and an interval between the node and another linked node that is to the right of or below the node, where the hash value of the at least one leaf node is computed from a level of the at least one leaf node within the skip list, the rank value of the least one leaf node and an interval associated with the at least one leaf node.

An apparatus as in any above, further comprising one or more aspects of the exemplary embodiments of the invention as described in further detail herein.

(7) In a further exemplary embodiment of the invention, a program storage device readable by a processor of an apparatus, tangibly embodying a program of instructions executable by the processor for performing operations, the operations comprising: storing information; and performing further operations with (e.g., on or using) the stored information, where the information relates to data comprising at least one file organized as a plurality of blocks with each block comprising at least a portion of the at least one file, where the apparatus is configured to perform operations with respect to (e.g., on or using) a skip list corresponding to the data, where the skip list comprises an ordered tree structure having a root node, at least one internal node and at least one leaf node, where each of the at least one leaf nodes corresponds to a block of the plurality of blocks, where each node of the skip list has an associated rank value corresponding to a size of a subtree of the skip list rooted at the node, where the skip list comprises a skip list or a RSA tree, where the skip list employs a hashing scheme to assign a hash value to each node of the skip list, where the hash value of the root node and the at least one internal node is computed from a level of the node within the skip list, the rank value of the node within the skip list and an interval between the node and another linked node that is to the right of or below the node, where the hash value of the at least one leaf node is computed from a level of the at least one leaf node within the skip list, the rank value of the least one leaf node and an interval associated with the at least one leaf node.

A program storage device as above, further comprising one or more aspects of the exemplary embodiments of the invention as described in further detail herein.

Figure 13:
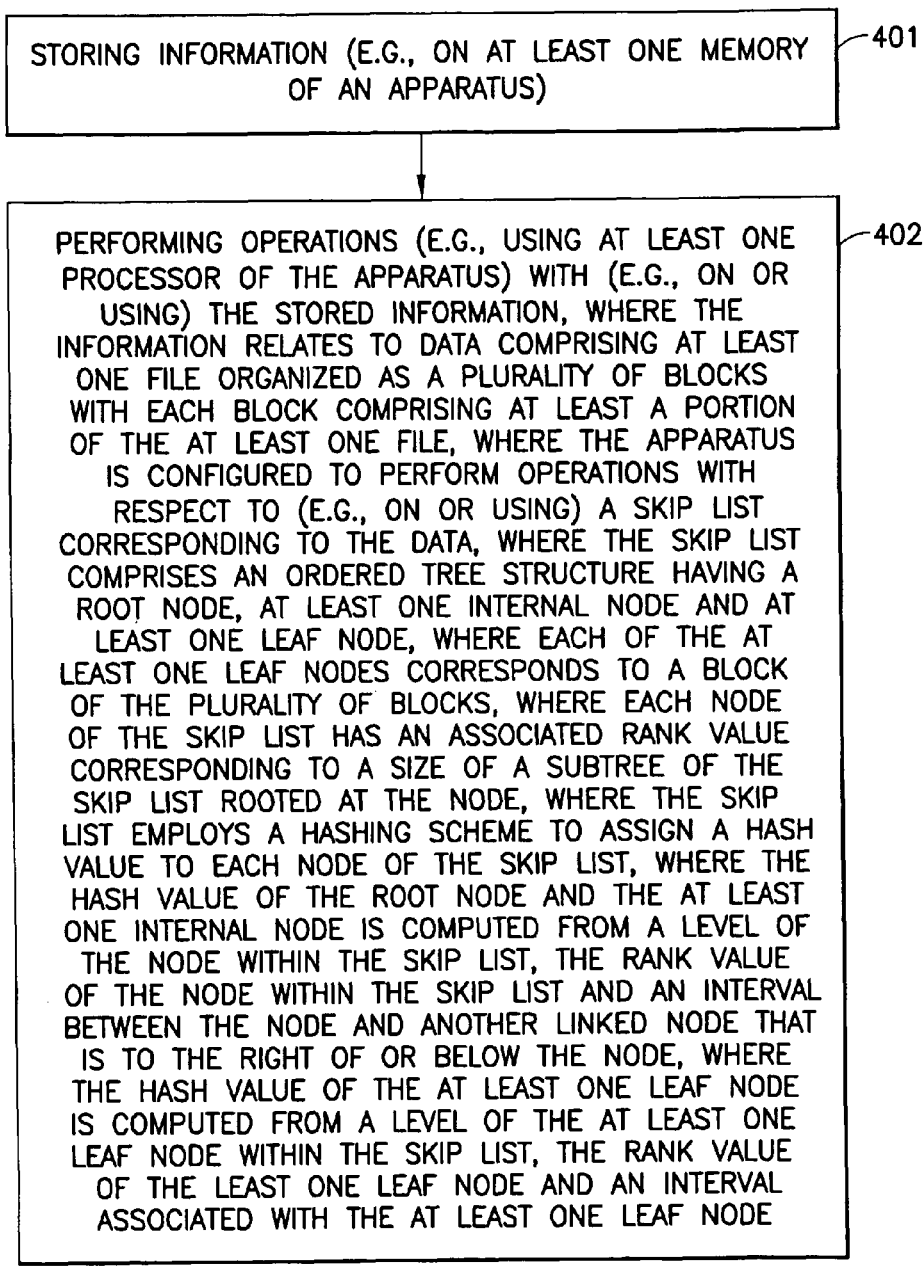
FIG. 13 depicts a flowchart illustrating another non-limiting example of a method for practicing the exemplary embodiments of this invention.

(8) In another exemplary embodiment of the invention, and as illustrated in FIG. 13, a method comprising: storing information (e.g., on at least one memory of an apparatus) (401); and performing operations (e.g., using at least one processor of the apparatus) with (e.g., on or using) the stored information (402), where the information relates to data comprising at least one file organized as a plurality of blocks with each block comprising at least a portion of the at least one file, where the apparatus is configured to perform operations with respect to (e.g., on or using) a skip list corresponding to the data, where the skip list comprises an ordered tree structure having a root node, at least one internal node and at least one leaf node, where each of the at least one leaf nodes corresponds to a block of the plurality of blocks, where each node of the skip list has an associated rank value corresponding to a size of a subtree of the skip list rooted at the node, where the skip list comprises a skip list or a RSA tree, where the skip list employs a hashing scheme to assign a hash value to each node of the skip list, where the hash value of the root node and the at least one internal node is computed from a level of the node within the skip list, the rank value of the node within the skip list and an interval between the node and another linked node that is to the right of or below the node, where the hash value of the at least one leaf node is computed from a level of the at least one leaf node within the skip list, the rank value of the least one leaf node and an interval associated with the at least one leaf node.

A method as above, further comprising one or more aspects of the exemplary embodiments of the invention as described in further detail herein.

(9) In a further exemplary embodiment of the invention, an apparatus comprising: means for storing information (e.g., at least one memory, at least one storage device, storage circuitry); and means for performing operations (e.g., at least one processor, at least one processing component, processing circuitry) with (e.g., on or using) the stored information, where the information relates to data comprising at least one file organized as a plurality of blocks with each block comprising at least a portion of the at least one file, where the apparatus is configured to perform operations with respect to (e.g., on or using) a skip list corresponding to the data, where the skip list comprises an ordered tree structure having a root node, at least one internal node and at least one leaf node, where each of the at least one leaf nodes corresponds to a block of the plurality of blocks, where each node of the skip list has an associated rank value corresponding to a size of a subtree of the skip list rooted at the node, where the skip list comprises a skip list or a RSA tree, where the skip list employs a hashing scheme to assign a hash value to each node of the skip list, where the hash value of the root node and the at least one internal node is computed from a level of the node within the skip list, the rank value of the node within the skip list and an interval between the node and another linked node that is to the right of or below the node, where the hash value of the at least one leaf node is computed from a level of the at least one leaf node within the skip list, the rank value of the least one leaf node and an interval associated with the at least one leaf node.

An apparatus as in any above, further comprising one or more aspects of the exemplary embodiments of the invention as described in further detail herein.

(10) In another exemplary embodiment of the invention, an apparatus comprising: storage circuitry configured to store information; and processing circuitry configured to perform operations with (e.g., on or using) the stored information, where the information relates to data comprising at least one file organized as a plurality of blocks with each block comprising at least a portion of the at least one file, where the apparatus is configured to perform operations with respect to (e.g., on or using) a skip list corresponding to the data, where the skip list comprises an ordered tree structure having a root node, at least one internal node and at least one leaf node, where each of the at least one leaf nodes corresponds to a block of the plurality of blocks, where each node of the skip list has an associated rank value corresponding to a size of a subtree of the skip list rooted at the node, where the skip list comprises a skip list or a RSA tree, where the skip list employs a hashing scheme to assign a hash value to each node of the skip list, where the hash value of the root node and the at least one internal node is computed from a level of the node within the skip list, the rank value of the node within the skip list and an interval between the node and another linked node that is to the right of or below the node, where the hash value of the at least one leaf node is computed from a level of the at least one leaf node within the skip list, the rank value of the least one leaf node and an interval associated with the at least one leaf node.

An apparatus as in any above, further comprising one or more aspects of the exemplary embodiments of the invention as described in further detail herein.

(11) In a further exemplary embodiment of the invention, a system comprising the apparatus of (1) and (6). In another exemplary embodiment of the invention, a system comprising the apparatus of (4) and (9). A system as in any above, further comprising one or more aspects of the exemplary embodiments of the invention as described in further detail herein.

(12) In another exemplary embodiment of the invention, an apparatus comprising: at least one memory configured to store (e.g., means for storing) data; and at least one processor configured to perform (e.g., means for performing) operations on the stored data, where the data comprises at least one file organized as a plurality of blocks with each block comprising at least a portion of the at least one file, where the apparatus is configured to maintain (e.g., means for maintaining, such as at least one processor) a RSA tree corresponding to the stored data, where the RSA tree comprises an ordered tree structure having a plurality of nodes including at least one leaf node, where each of the at least one leaf nodes corresponds to a block of the plurality of blocks, where each node of the skip list has an associated rank value corresponding to a size of a subtree of the RSA tree rooted at the node, where an $\epsilon$ is chosen between 0 and 1 such that the tree structure has $O(1/\epsilon)$ levels with each node having degree $O(n^\epsilon)$, where the RSA tree is considered a B-tree with a lower bound on degree of $t=3n^\epsilon/4$ and an upper bound on degree of $2t=3n^\epsilon/2$, where the tree structure is rebuilt when a number of blocks increases from n to 2n or decreases from n to n/4.

An apparatus as above, where each leaf node has an associated homomorphic tag that is a function of the associated block, wherein a tag size of the associated homomorphic tag is smaller than a block size of the associated block and the homomorphic tags enable blockless verification, where the RSA tree is configured to secure the homomorphic tags. An apparatus as in any above, further comprising one or more aspects of the exemplary embodiments of the invention as described in further detail herein.

The exemplary embodiments of the invention, as discussed above and particularly as described with respect to exemplary methods, may be implemented as a computer program product comprising program instructions embodied on a tangible computer-readable medium. Execution of the program instructions results in operations comprising steps of utilizing the exemplary embodiments or steps of the exemplary method.

The exemplary embodiments of the invention, as discussed above and as particularly described with respect to exemplary methods, may be implemented in conjunction with a program storage device (e.g., a computer-readable medium, a memory) readable by a machine (e.g., a computer, a portable computer, a device), tangibly embodying a program of instructions (e.g., a program, a computer program) executable by the machine (or by a processor of the machine) for performing operations. The operations comprise steps of utilizing the exemplary embodiments or steps of the exemplary method.

The blocks shown in FIGS. 12 and 13 further may be considered to correspond to one or more functions and/or operations that are performed by one or more components, circuits, chips, apparatus, processors, computer programs and/or function blocks. Any and/or all of the above may be implemented in any practicable solution or arrangement that enables operation in accordance with the exemplary embodiments of the invention as described herein.

In addition, the arrangement of the blocks depicted in FIGS. 12 and 13 should be considered merely exemplary and non-limiting. It should be appreciated that the blocks shown in FIGS. 12 and 13 may correspond to one or more functions and/or operations that may be performed in any order (e.g., any suitable, practicable and/or feasible order) and/or concurrently (e.g., as suitable, practicable and/or feasible) so as to implement one or more of the exemplary embodiments of the invention. In addition, one or more additional functions, operations and/or steps may be utilized in conjunction with those shown in FIGS. 12 and 13 so as to implement one or more further exemplary embodiments of the invention.

That is, the exemplary embodiments of the invention shown in FIGS. 12 and 13 may be utilized, implemented or practiced in conjunction with one or more further aspects in any combination (e.g., any combination that is suitable, practicable and/or feasible) and are not limited only to the steps, blocks, operations and/or functions shown in FIGS. 12 and 13.

Still further, the various names used for the parameters and variables are not intended to be limiting in any respect, as these parameters may be identified by any suitable names.

Any use of the terms "connected," "coupled" or variants thereof should be interpreted to indicate any such connection or coupling, direct or indirect, between the identified elements. As a non-limiting example, one or more intermediate elements may be present between the "coupled" elements. The connection or coupling between the identified elements may be, as non-limiting examples, physical, electrical, magnetic, logical or any suitable combination thereof in accordance with the described exemplary embodiments. As non-limiting examples, the connection or coupling may comprise one or more printed electrical connections, wires, cables, mediums or any suitable combination thereof.

Generally, various exemplary embodiments of the invention can be implemented in different mediums, such as software, hardware, logic, special purpose circuits or any combination thereof. As a non-limiting example, some aspects may be implemented in software which may be run on a computing device, while other aspects may be implemented in hardware.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications will still fall within the scope of the teachings of the exemplary embodiments of the invention.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. An apparatus comprising:
at least one memory configured to store data; and
at least one processor configured to perform operations on the stored data,
where the data comprises at least one file organized as a plurality of blocks with each block comprising at least a portion of the at least one file,
where the apparatus is configured to maintain a skip list corresponding to the stored data, where the skip list comprises an ordered tree structure having a root node, at least one internal node and at least one leaf node, where each of the at least one leaf nodes corresponds to a block of the plurality of blocks, where each node of the skip list has an associated rank value corresponding to a size of a subtree of the skip list rooted at the node,
where the skip list employs a hashing scheme to assign a hash value to each node of the skip list,
where the hash value of the root node and the at least one internal node is computed from a level of the node within the skip list, the rank value of the node within the skip list and an interval between the node and another linked node that is to the right of or below the node,
where the hash value of the at least one leaf node is computed from a level of the at least one leaf node within the skip list, the rank value of the least one leaf node and an interval associated with the at least one leaf node.

2. The apparatus of claim 1, where the hash value $f(v)$ of a node v in the skip list is computed as follows:

if $l(v)>0$ then $f(v)=h(A\|I(dwn(v))\|f(dwn(v)),A\|I(rgt(v))\|f(rgt(v)))$;

if $l(v)=0$ and $rgt(v)$=null then $f(v)=h(A\|I(v)\|T(dat(v)),A\|I(suc(v))\|T(dat(suc(v))))$;

if $l(v)=0$ and $rgt(v)\neq$null then $f(v)=h(A\|I(v)\|T(dat(v)),A\|I(rgt(v))\|f(rgt(v)))$, where $A=l(v)\|r(v)$, $\|$ denotes a concatenation operator, $suc(v)$ is a successor node of v, $dat(v)$ denotes data at node v, $I(v)$ denotes an interval corresponding to node v, $r(v)$ denotes the rank of node v, $l(v)$ is the level of node v within the skip list, $rgt(v)$ is a first pointer indicating a next node to the right of node v and $dwn(v)$ is a second pointer indicating a next node below node v.

3. The apparatus of claim 1, where a first operation performed by the at least one processor comprises constructing a proof $\Pi(i)$ for a block i as follows:
determine a reverse search path $v_1, v_2, \ldots, v_m$ of nodes in the skip list for the block i; and return $\Pi(i)=\{A(v_i), A(v_2), \ldots, A(v_m)\}$,
where $A(v_j)$ is a 4-tuple for a node $v_j$ of the skip list, $f(v_j)$ is the hash value for the node $v_j$ and $A(v_j)$ includes the level $l(v_j)$, the rank $r(v_j)$, an interval $I(v_j)$ for the node $v_j$ and the hash value $f(v_j)$.

4. The apparatus of claim 3, where a second operation performed by the at least one processor comprises verifying the proof $\Pi(i)$ returned by the first operation as follows:
if $\lambda(\Pi(i))=M_c$ then return ACCEPT;
else return REJECT,
where $M_c$ is locally stored metadata, $\lambda(\Pi(i))=\lambda(A(v_1), A(v_2), \ldots, A(v_m))$ and denotes a last element of $S(A(v_i), A(v_2), \ldots, A(v_m))$, $S(A(v_1), A(v_2), \ldots, A(v_m))=(L,n,[1,n], f(s))$, L is a maximum level of the skip list, n is a number of stored items, $f(s)$ is the hash value of a top-leftmost node of the skip list, ACCEPT indicates acceptance of the proof $\Pi(i)$ and REJECT indicates rejection of the proof $\Pi(i)$.

5. The apparatus of claim 3, where a third operation performed by the at least one processor comprises updating the skip list based on an update operation upd as follows:
if upd=ins then insert T $(m_k)$ after block i in the skip list;
if upd=del then delete block i in the skip list;
if upd=modify then set $T(m_i)$=T in the skip list;
forall affected nodes v, update $A(v)$, $f(v)$ to $A'(v)$, $f'(v)$;
return $\{f'(s), \Pi(i)\}$,
where $T(m_i)$ is a representation of a modification for the block i, $m_k$ is a new block to be inserted in the skip list, $A'(v)$ is an updated 4-tuple for the node v, $f'(v)$ is an updated hash value for the node v and $f'(s)$ is an updated hash value of a top-leftmost node of the skip list.

6. The apparatus of claim 5, where a fourth operation performed by the at least one processor comprises verifying an updated proof $\Pi'(i)$ corresponding to the update performed by the third operation as follows:
if $\lambda(\Pi'(i))=M'_c$ then return ACCEPT;
else return REJECT;
where $M'_c$ is locally stored updated metadata, $\lambda(\Pi'(i))=\lambda(A'(v_1), A'(v_2), \ldots, A'(v_m))$ and denotes a last element of $S'(A'(v_1),A'(v_2),\ldots,A'(v_m))$, $S'(A'(v_1),A'(v_2),\ldots,A'(v_m))=(L, n,[1, n], f'(s))$, L is a maximum level of the skip list, n' is an updated number of stored items, ACCEPT indicates acceptance of the updated proof $\Pi'(i)$ and REJECT indicates rejection of the updated proof $\Pi'(i)$.

7. The apparatus of claim 1, where the size of the subtree is measured as a number of leaf nodes reachable from the node or as a total block size of the blocks associated with the leaf nodes reachable from the node.

8. The apparatus of claim 1, where each leaf node of the skip list has an associated homomorphic tag that is a function of the associated block, wherein a tag size of the associated homomorphic tag is smaller than a block size of the associated block and the homomorphic tags enable blockless verification.

9. The apparatus of claim 8, where usage of the homomorphic tags enables a client to check the integrity of the at least one file by an operation performed on the homomorphic tags and without the client downloading an entirety of the at least one file.

10. The apparatus of claim 1, where the rank value does not comprise a search key.

11. The apparatus of claim 1, further comprising an input configured to receive an update instruction from a client, the update instruction comprising an instruction to perform at least one of: modifying at least one block, deleting at least one block and inserting at least one new block.

12. The apparatus of claim 11, where the at least one processor is further configured to perform the update instruction on the skip list and obtain an updated skip list, an updated hash value for the root node and an update proof corresponding to the updated skip list.

13. The apparatus of claim 12, further comprising an output configured to send at least the update proof and the updated hash value of the root node to the client.

14. The apparatus of claim 13, where the update proof and the updated hash value of the root node enable the client to authenticate the performance of the update instruction by the apparatus.

15. The apparatus of claim 1, further comprising an input configured to receive a challenge from a client, where the at least one processor is further configured to generate a challenge proof based on the received challenge and the apparatus further comprises an output configured to send the challenge proof to the client, the challenge proof enabling the client to verify that at least a portion of the data stored by the apparatus is intact.

16. The apparatus of claim 1, where the at least one file comprises a file system and the apparatus supports versioning file systems by use of at least one key-based authenticated dictionary, keyed by revision number, between one or more dictionaries for each file's directory and each file's data.

17. The apparatus of claim 1, where a block size of at least one block of the plurality of blocks is variable.

18. The apparatus of claim 1, where the apparatus comprises a remote untrusted server.

19. A storage device having computer-readable instructions encoded thereon, which, when executed by at least one processor, perform a method comprising:
   storing data, where the data comprises at least one file organized as a plurality of blocks with each block comprising at least a portion of the at least one file; and
   maintaining a skip list corresponding to the stored data, where the skip list comprises an ordered tree structure having a root node, at least one internal node and at least one leaf node, where each of the at least one leaf nodes corresponds to a block of the plurality of blocks, where each node of the skip list has an associated rank value corresponding to a size of a subtree of the skip list rooted at the node,
   where the skip list employs a hashing scheme to assign a hash value to each node of the skip list,
   where the hash value of the root node and the at least one internal node is computed from a level of the node within the skip list, the rank value of the node within the skip list and an interval between the node and another linked node that is to the right of or below the node,
   where the hash value of the at least one leaf node is computed from a level of the at least one leaf node within the skip list, the rank value of the least one leaf node and an interval associated with the at least one leaf node.

20. The storage device of claim 19, where the hash value $f(v)$ of a node v in the skip list is computed as follows:

$$\text{if } l(v) > 0 \text{ then } f(v) = h(A\|I(dwn(v))\|f(dwn(v)), A\|I(rgt(v))\|f(rgt(v)));$$

$$\text{if } l(v) = 0 \text{ and } rgt(v) = \text{null then } f(v) = h(A\|I(v)\|T(dat(v)), A\|I(suc(v))\|T(dat(suc(v))));$$

$$\text{if } l(v) = 0 \text{ and } rgt(v) \neq \text{null then } f(v) = h(A\|I(v)\|T(dat(v)), A\|I(rgt(v))\|f(rgt(v))),$$

where $A = l(v)\|r(v)$, $\|$ denotes a concatenation operator, suc(v) is a successor node of v, dat(v) denotes data at node v, I(v) denotes an interval corresponding to node v, r(v) denotes the rank of node v, l(v) is the level of node v within the skip list, rgt(v) is a first pointer indicating a next node to the right of node v and dwn(v) is a second pointer indicating a next node below node v.

* * * * *